United States Patent
Park et al.

(10) Patent No.: US 12,292,507 B2
(45) Date of Patent: May 6, 2025

(54) METHOD AND APPARATUS FOR DETECTING CURB USING LIDAR SENSOR AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Jin Won Park, Seoul (KR); Yoon Ho Jang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 396 days.

(21) Appl. No.: 17/746,204

(22) Filed: May 17, 2022

(65) Prior Publication Data

US 2022/0390608 A1 Dec. 8, 2022

(30) Foreign Application Priority Data

Jun. 8, 2021 (KR) .................. 10-2021-0074225

(51) Int. Cl.
*G01S 17/89* (2020.01)
*G01S 17/931* (2020.01)
*B60W 60/00* (2020.01)

(52) U.S. Cl.
CPC ............ *G01S 17/89* (2013.01); *G01S 17/931* (2020.01); *B60W 60/001* (2020.02); *B60W 2420/408* (2024.01); *B60W 2552/50* (2020.02)

(58) Field of Classification Search
CPC .... G01S 17/89; G01S 17/931; B60W 60/001; B60W 2552/50; B60W 2420/408; B60W 2554/60
See application file for complete search history.

(56) References Cited

U.S. PATENT DOCUMENTS

| | | | |
|---|---|---|---|
| 8,537,338 B1 | 9/2013 | Medasani et al. | |
| 9,529,087 B2 | 12/2016 | Stainvas Olshansky et al. | |
| 10,210,286 B1 | 2/2019 | Pope et al. | |
| 2011/0164037 A1* | 7/2011 | Yoshida | G06T 17/05 345/419 |
| 2015/0120244 A1* | 4/2015 | Ma | G06T 7/75 702/172 |
| 2016/0026184 A1* | 1/2016 | Stainvas Olshansky | G01S 17/89 356/4.01 |
| 2016/0147915 A1* | 5/2016 | Pope | G06F 30/13 703/1 |

FOREIGN PATENT DOCUMENTS

| | | | | |
|---|---|---|---|---|
| DE | 102016110461 A1 * | 12/2017 | ......... | B60W 40/076 |
| JP | 2020149079 A | 9/2020 | | |
| KR | 20120052691 A | 5/2012 | | |

OTHER PUBLICATIONS

Method of detecting inclination in a roadway (Year: 2017).*

* cited by examiner

*Primary Examiner* — Catherine T. Rastovski
*Assistant Examiner* — Sharad Timilsina
(74) *Attorney, Agent, or Firm* — Slater Matsil, LLP

(57) ABSTRACT

An embodiment method of detecting a curb includes selecting road points from a point cloud acquired by a LiDAR sensor and detecting multiple consecutive points, having a constant first slope in a first plane viewed from above and a second slope having a constant sign in a second plane viewed from a side, as curb candidate points from among the road points, the curb candidate points being candidates for curb points.

20 Claims, 12 Drawing Sheets

FIG. 12A   FIG. 12B   FIG. 12C
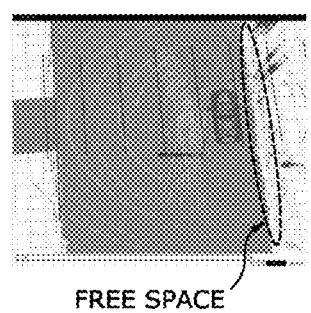 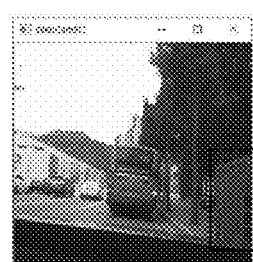 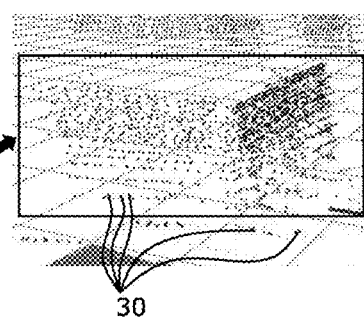
FREE SPACE                              30
FIG. 13
600A
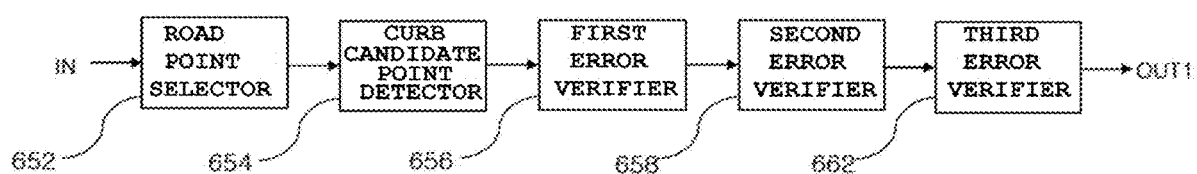
IN → ROAD POINT SELECTOR → CURB CANDIDATE POINT DETECTOR → FIRST ERROR VERIFIER → SECOND ERROR VERIFIER → THIRD ERROR VERIFIER → OUT1
652   654   656   658   662

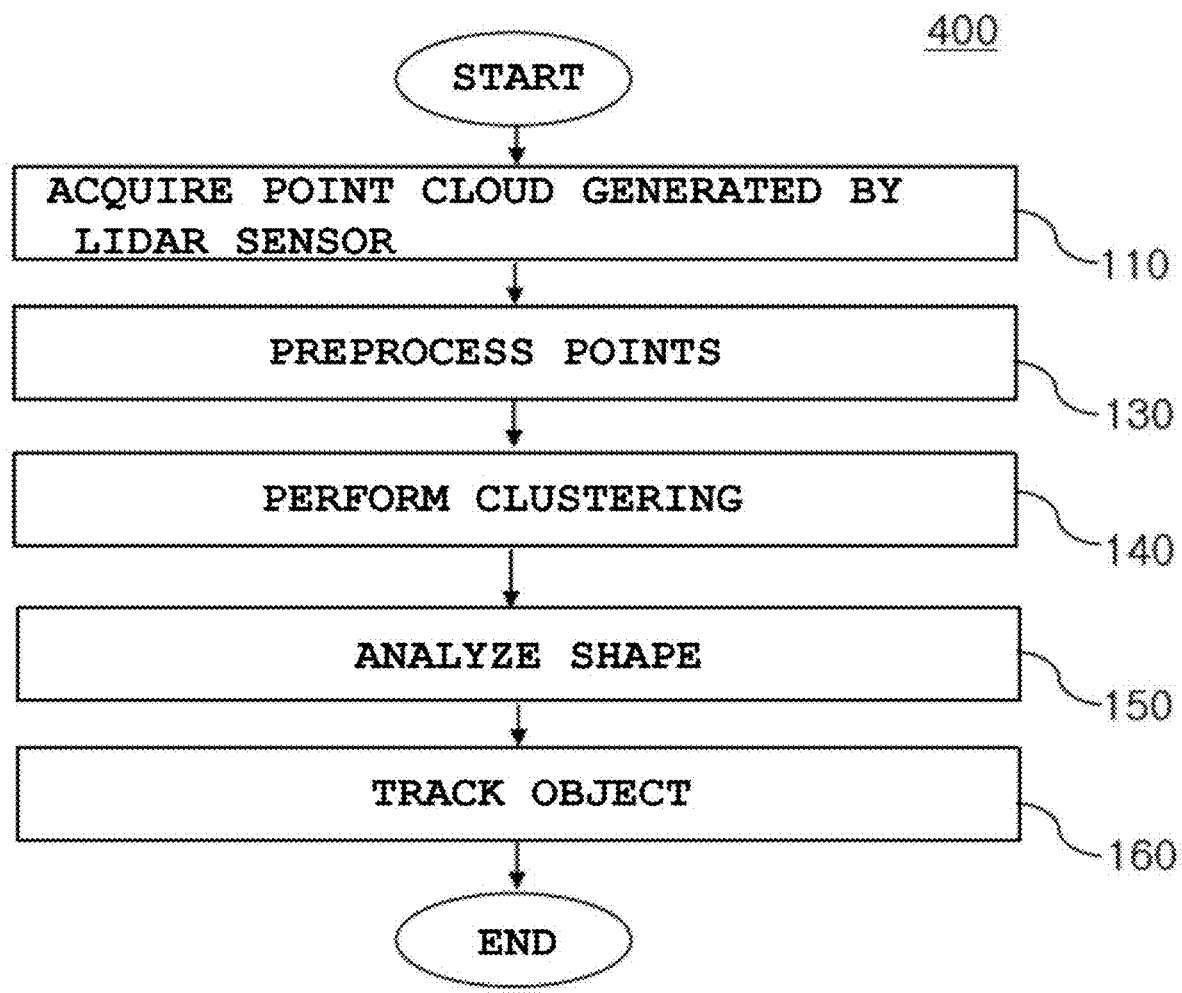

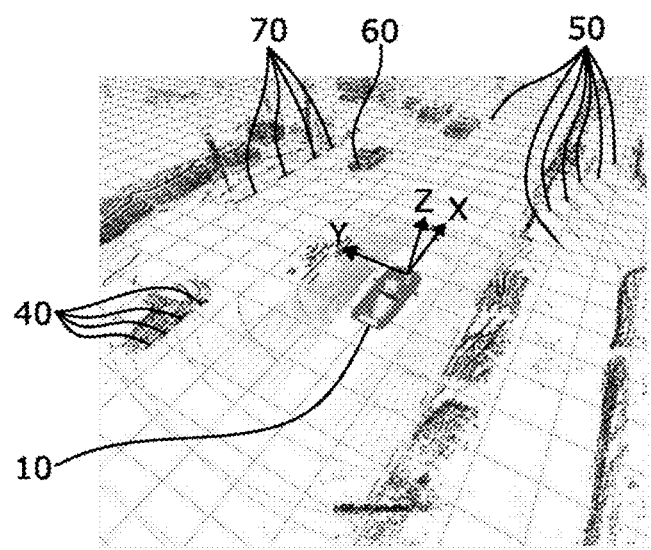
FIG. 15A
FIG. 15B

METHOD AND APPARATUS FOR DETECTING CURB USING LIDAR SENSOR AND RECORDING MEDIUM STORING PROGRAM TO EXECUTE THE METHOD

CROSS-REFERENCE TO RELATED APPLICATIONS

This application claims the benefit of Korean Patent Application No. 10-2021-0074225, filed on Jun. 8, 2021, which application is hereby incorporated herein by reference.

TECHNICAL FIELD

Embodiments relate to a method and apparatus for detecting a curb using a LiDAR sensor and to a recording medium storing a program to execute the method.

BACKGROUND

In order to process massive three-dimensional (3D) point clouds, acquired by a LiDAR sensor during autonomous driving, in real time using limited computing resources, a heuristic algorithm, which uses a scan pattern of the LiDAR sensor, may be used, rather than an algorithm that involves complex calculations, such as random sample consensus (RANSAC). The scan pattern/method/rule inherent to a LiDAR sensor may be used as a heuristic algorithm in order to configure LiDAR logic.

In the case of detecting a curb using the aforementioned heuristic algorithm, an error is present in information about the detected curb irrespective of the performance of a LiDAR sensor. The reason for this is that not only an object such as a wall or a vehicle but also an uneven road has physical characteristics similar to those of a curb. Therefore, research for accurately detecting information about a curb from a point cloud acquired by a LiDAR sensor is underway.

SUMMARY

Accordingly, embodiments are directed to a method and apparatus for detecting a curb using a LiDAR sensor and to a recording medium storing a program to execute the method that substantially obviate one or more problems due to limitations and disadvantages of the related art.

Embodiments provide a method and apparatus for detecting a curb using a LiDAR sensor, which are capable of accurately detecting a curb, and a recording medium storing a program to execute the method.

However, the objects to be accomplished by the embodiments are not limited to the above-mentioned objects, and other objects not mentioned herein will be clearly understood by those skilled in the art from the following description.

A method of detecting a curb using a LiDAR sensor according to an embodiment may include selecting road points from a point cloud acquired by the LiDAR sensor and detecting multiple consecutive points, having a constant first slope in a first plane viewed from above and a second slope having a constant sign in a second plane viewed from the side, as curb candidate points from among the road points, the curb candidate points being candidates for curb points.

For example, the detecting the curb candidate points may include finding multiple consecutive current points, having a height equal to or less than a threshold height and located a first spacing distance from a previous point, from among the road points, the first spacing distance being shorter than a first threshold distance, determining whether the first slope formed by the found multiple consecutive current points is constant, determining whether the sign of the second slope is constant when the first slope is constant, and finally determining the found multiple consecutive current points to be the curb candidate points when the sign of the second slope is constant.

For example, the finding the multiple consecutive current points may include determining whether the heights of sample points selected sequentially from among the road points in the order of a sample index in each layer are equal to or less than the threshold height, storing the coordinates of the sample points having heights equal to or less than the threshold height when the previous point, selected before the sample points having heights equal to or less than the threshold height are selected, is not present, storing the coordinates of the sample points when the previous point is present and when the first spacing distance between the sample points and the previous point is shorter than the first threshold distance, checking, when the number of the sample points having the stored coordinates is not "I" (where "I" is a positive integer of 2 or greater), the heights of the sample points, and determining, when the number of the sample points having the stored coordinates is "I", the "I" sample points to be the found multiple consecutive current points.

For example, the determining whether the first slope is constant may include selecting points spaced a constant interval apart from each other from among the found multiple consecutive current points, determining, among the selected points, whether at least one of a difference between neighboring slopes of neighboring points, a difference between non-neighboring slopes of non-neighboring points that are not adjacent to each other, or a difference between all of slopes including the neighboring slopes and the non-neighboring slopes is within a predetermined range of permissible values, and determining the first slope to be constant when at least one of the difference between the neighboring slopes, the difference between the non-neighboring slopes, or the difference between all of the slopes including the neighboring slopes and the non-neighboring slopes is within the predetermined range of permissible values.

For example, the finally determining the found multiple consecutive current points to be the curb candidate points may include determining the "I" sample points having the stored coordinates to be the curb candidate points when the sign of the second slope is determined to be constant.

For example, the method may further include a first error verification step of detecting, when multiple neighboring points located in a layer adjacent to the layer in which the curb candidate points are located are non-road points, rather than road points, points other than the curb points from among the curb candidate points based on the variance and the average of the coordinates of the multiple neighboring points.

For example, the first error verification step may include determining whether the multiple neighboring points are the non-road points, obtaining the average and the variance of the coordinates of the multiple neighboring points when the multiple neighboring points are the non-road points, determining whether the variance is less than a threshold variance, determining whether a first absolute value is less than a threshold average as follows: |AV−P| < THa (where "|AV−P|" represents the first absolute value, "AV" represents the average, "P" represents the coordinates of the curb candidate points, and "THa" represents the threshold average), and determining the curb candidate points not to be the curb points when the variance is less than the threshold variance and when the first absolute value is less than the threshold average.

For example, the first error verification step may include a $1\text{-}1^{st}$ error verification step of determining whether the curb candidate points having a slope closer to a vertical axis are not the curb points and a $1\text{-}2^{nd}$ error verification step of determining whether the curb candidate points having a slope closer to a horizontal axis are not the curb points.

For example, in the $1\text{-}1^{st}$ error verification step or the $1\text{-}2^{nd}$ error verification step, the variance may correspond to the variance of the weighted sum of the horizontal-axis coordinates and the vertical-axis coordinates of the multiple neighboring points, the average may correspond to the average of the weighted sum of the horizontal-axis coordinates and the vertical-axis coordinates of the multiple neighboring points, and the "P" may represent the weighted sum of the horizontal-axis coordinates and the vertical-axis coordinates of the curb candidate points. A vehicle equipped with the LiDAR sensor may travel in a first direction parallel to the vertical axis, and a second direction parallel to the horizontal axis may intersect the first direction.

For example, in the layer adjacent to the layer in which the curb candidate points are located, when neighboring points located in the vicinity of the azimuth at which the curb candidate points are located are the non-road points, points other than the curb points may be detected from among the curb candidate points based on the variance and the average.

For example, the method may further include a second error verification step of detecting, using a reference line segment formed by the curb candidate points belonging to an arbitrary layer and a target line segment formed by the curb candidate points belonging to a layer adjacent to the arbitrary layer, points other than the curb points from among the curb candidate points belonging to the arbitrary layer.

For example, the second error verification step may include selecting a reference start point and a reference ending point forming the reference line segment from among the curb candidate points belonging to the arbitrary layer, obtaining the length of the reference line segment formed by the reference start point and the reference ending point when the reference start point and the reference ending point are located in the same layer, obtaining the coefficients of the reference line segment when the length of the reference line segment is shorter than a threshold length, selecting a target start point from among the curb candidate points belonging to the layer adjacent to the arbitrary layer, selecting a target ending point present in the same layer as the target start point and located within a second threshold distance from the target start point, obtaining a second spacing distance between the reference line segment and the target start point using the coordinates of the target start point and the coefficients, forming the target line segment using the target start point and the target ending point, obtaining a reference slope of the reference line segment, a target slope of the target line segment, a third spacing distance between the reference start point and the target start point, and a third slope of a straight line interconnecting the target start point and the reference ending point, and finding points other than the curb points from among the curb candidate points belonging to the arbitrary layer using at least one of the reference slope, the target slope, the second spacing distance, the third spacing distance, or the third slope.

For example, the finding points other than the curb points from among the curb candidate points may include determining whether a second absolute value of a difference between the reference slope and the target slope is less than a first threshold value, determining whether the second spacing distance is shorter than a third threshold distance when the second absolute value is less than the first threshold value, determining whether the third spacing distance is shorter than a fourth threshold distance when the second spacing distance is shorter than the third threshold distance, determining whether a third absolute value of a difference between the reference slope and the third slope is less than a second threshold value when the third spacing distance is shorter than the fourth threshold distance, and determining the curb candidate points belonging to the arbitrary layer not to be the curb points when the second absolute value is equal to or greater than the first threshold value, when the second spacing distance is equal to or longer than the third threshold distance, when the third spacing distance is equal to or longer than the fourth threshold distance, or when the third absolute value is equal to or greater than the second threshold value, and when both the target start point and the target ending point are selected in the layer adjacent to the arbitrary layer.

For example, the method may further include a third error verification step of determining the curb candidate points not to be the curb points when the absolute value of a difference in vertical-axis coordinates between points located in a free space and the curb candidate points is less than a third threshold value and when the absolute value of a difference in horizontal-axis coordinates between the points located in the free space and the curb candidate points is less than a fourth threshold value. A vehicle equipped with the LiDAR sensor may travel in a first direction parallel to the vertical axis, and a second direction parallel to the horizontal axis may intersect the first direction.

An apparatus for detecting a curb using a LiDAR sensor according to another embodiment may include a road point selector, configured to select road points from a point cloud acquired by the LiDAR sensor, and a curb candidate point detector, configured to detect multiple consecutive points, having a constant first slope in a first plane viewed from above and a second slope having a constant sign in a second plane viewed from the side, as curb candidate points from among the road points, the curb candidate points being candidates for curb points.

For example, the apparatus may further include a first error verifier configured to detect, when multiple neighboring points located in a layer adjacent to the layer in which the curb candidate points are located are non-road points, rather than road points, points other than the curb points from among the curb candidate points based on the variance and the average of the coordinates of the multiple neighboring points.

For example, the apparatus may further include a second error verifier configured to detect, using a reference line segment formed by the curb candidate points belonging to an arbitrary layer and a target line segment formed by the curb candidate points belonging to a layer adjacent to the arbitrary layer, points other than the curb points from among the curb candidate points belonging to the arbitrary layer.

For example, the apparatus may further include a third error verifier configured to determine the curb candidate points not to be the curb points when the absolute value of a difference in vertical-axis coordinates between points located in a free space and the curb candidate points is less than a third threshold value and when the absolute value of a difference in horizontal-axis coordinates between the points located in the free space and the curb candidate points is less than a fourth threshold value. A vehicle equipped with the LiDAR sensor may travel in a first direction parallel to a vertical axis, and a second direction parallel to a horizontal axis may intersect the first direction.

According to still another embodiment, a recording medium in which a program for executing a method of detecting a curb using a LiDAR sensor is recorded may store a program to implement a function of selecting road points from a point cloud acquired by the LiDAR sensor and a function of detecting multiple consecutive points, having a constant first slope in a first plane viewed from above and a second slope having a constant sign in a second plane viewed from the side, as curb candidate points from among the road points, the curb candidate points being candidates for curb points. The recording medium may be read by a computer system.

For example, the program may further implement a first error verification function of, when multiple neighboring points located in a layer adjacent to the layer in which the curb candidate points are located are non-road points, rather than the road points, detecting points other than the curb points from among the curb candidate points based on the variance and the average of the coordinates of the multiple neighboring points, a second error verification function of, using a reference line segment formed by the curb candidate points belonging to an arbitrary layer and a target line segment formed by the curb candidate points belonging to a layer adjacent to the arbitrary layer, detecting points other than the curb points from among the curb candidate points belonging to the arbitrary layer, and a third error verification function of, when the absolute value of a difference in vertical-axis coordinates between points located in a free space and the curb candidate points is less than a third threshold value and when the absolute value of a difference in horizontal-axis coordinates between the points located in the free space and the curb candidate points is less than a fourth threshold value, determining the curb candidate points not to be the curb points. A vehicle equipped with the LiDAR sensor may travel in a first direction parallel to a vertical axis, and a second direction parallel to a horizontal axis may intersect the first direction.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of the invention. In the drawings:

FIGS. 12A to 12C are views for helping understanding step 250A shown in FIG. 11;

FIG. 13 is a block diagram of an embodiment of the curb detector shown in FIG. 2;

FIG. 14 is a flowchart for explaining an object-tracking method according to an embodiment; and FIGS. 15A and 15B are views showing final curb points obtained by the curb detection method according to an embodiment.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method 100 and an apparatus 1000 for detecting a curb using a LiDAR sensor and a recording medium storing a program to execute the method 100 according to embodiments will be described with reference to the accompanying drawings.

The method 100 and the apparatus 1000 for detecting a curb using a LiDAR sensor and the recording medium storing a program to execute the method 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, according to another embodiment, the x-axis, the y-axis, and the z-axis may intersect each other obliquely.

Figure 1:
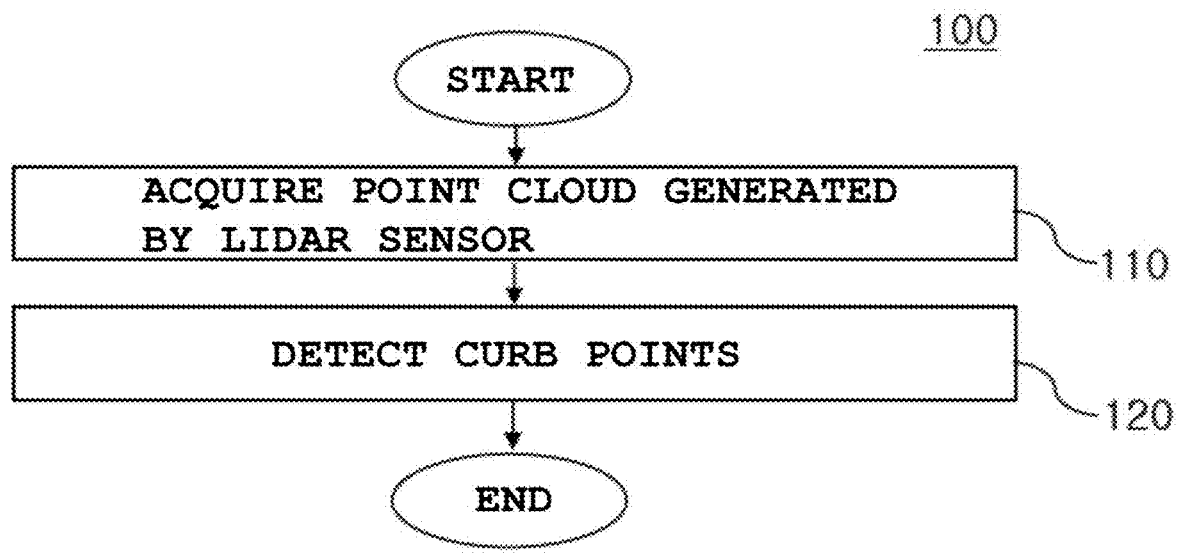
FIG. 1 is a flowchart for explaining a curb detection method according to an embodiment.
Figure 2:
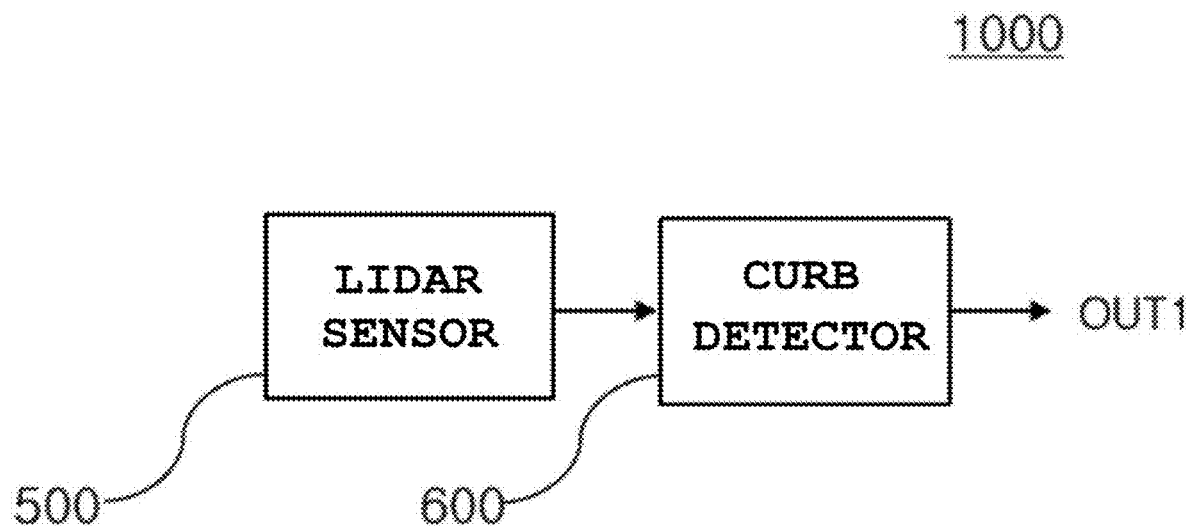
FIG. 2 is a schematic block diagram of a curb detection apparatus according to an embodiment.

FIG. 1 is a flowchart for explaining a curb detection method 100 according to an embodiment, and FIG. 2 is a schematic block diagram of a curb detection apparatus 1000 according to an embodiment.

The curb detection method 100 shown in FIG. 1 will be described as being performed by the curb detection apparatus 1000 shown in FIG. 2, but the embodiments are not limited thereto.

The curb detection apparatus 1000 may include a light detection and ranging (LiDAR) sensor 500 and a curb detector 600.

According to the curb detection method 100 according to an embodiment, a point cloud generated by the LiDAR sensor 500 is first acquired (step 110). For example, the point cloud may be acquired by parsing points acquired by the LiDAR sensor 500. Here, the points acquired by the LiDAR sensor 500 may be received in the form of Ethernet packets. In this case, "parsing" refers to a process of converting the packets into point clouds having an easy-to-process point structure.

The LiDAR sensor 500 may be provided in a plural number, and the plurality of LiDAR sensors 500 may be mounted at various positions on a vehicle (hereinafter referred to as a "host vehicle"). For example, the LiDAR sensors 500 may be disposed at various positions on the host vehicle, such as at the roof, the front side portions, and the rear side portions of the host vehicle. However, the embodiments are not limited to any specific position at which the LiDAR sensor 500 is disposed in the host vehicle or to any specific number of LiDAR sensors 500.

For example, the LiDAR sensor 500 may fire (or radiate or emit) a single circular laser pulse (or laser beam) having a wavelength of 905 nm to 1550 nm to the surroundings of the host vehicle, and may measure the time taken for the laser pulse reflected from an object present within a measurement range to return, thereby sensing information on the object, for example, the distance from the LiDAR sensor 500 to the object, the orientation of the object, the speed of the object, the temperature of the object, the material distribution of the object, and the concentration characteristics of the object. Here, the object may be, for example, another vehicle (or a neighboring vehicle), a person, or an obstacle, such as a wall, present outside the host vehicle equipped with the LiDAR sensor 500. For better understanding of the method 100 and apparatus 1000 for detecting a curb according to the embodiments, among objects sensed by the LiDAR sensor 500, another vehicle (or a neighboring vehicle), a person, or an obstacle, such as a wall, will be regarded as an object, but a road surface or a curb will not be regarded as an object. The embodiments are not limited to any specific type of object.

After step 110, the curb detector 600 may detect points corresponding to a curb (hereinafter referred to as "curb points") from the point cloud provided from the LiDAR sensor 500, and may output the result of detection to an output terminal OUT1 (step 120).

Hereinafter, an embodiment 120A of step 120 shown in FIG. 1 will be described with reference to the accompanying drawings.

Figure 3:
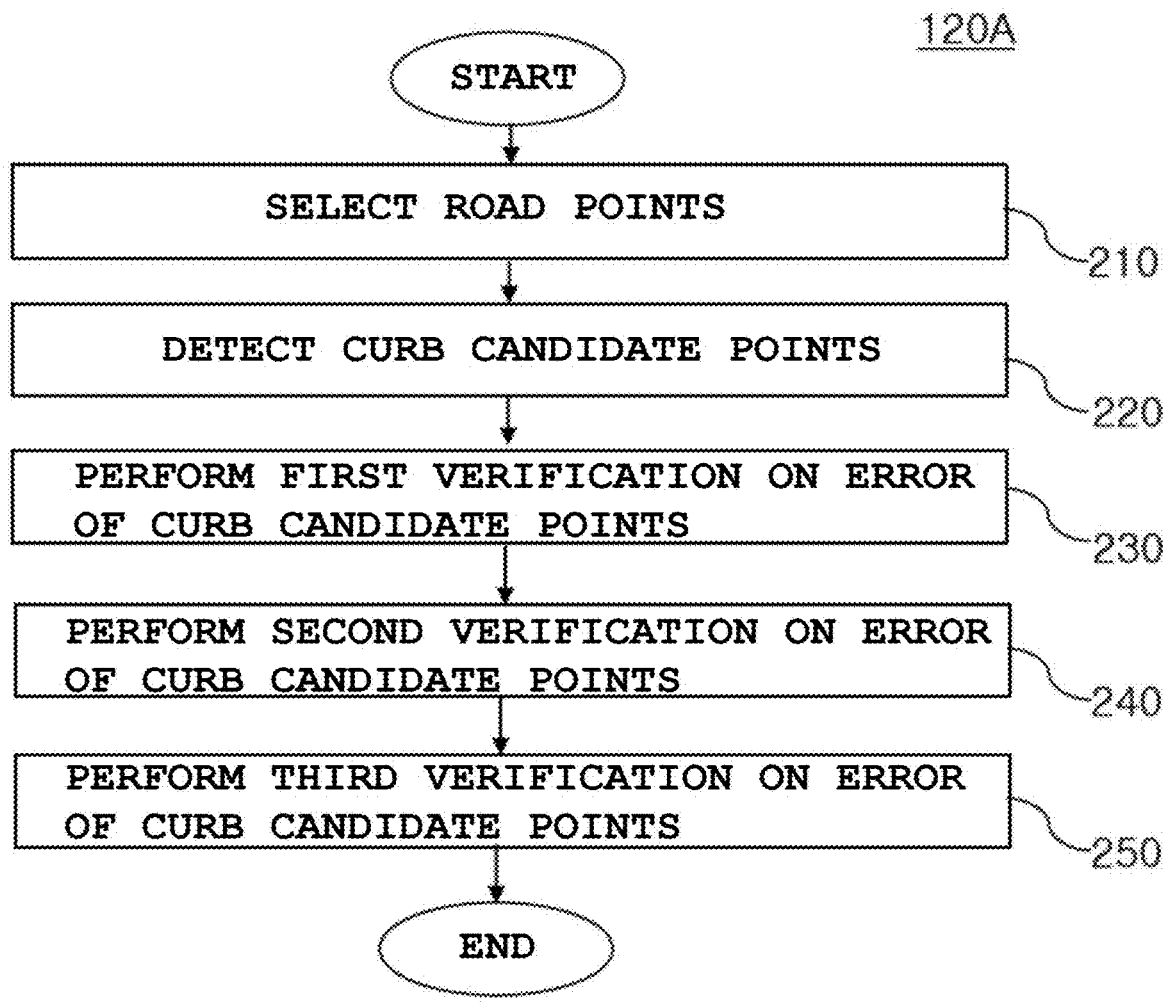
FIG. 3 is a flowchart for explaining an embodiment of step 120 shown in FIG. 1.

FIG. 3 is a flowchart for explaining an embodiment 120A of step 120 shown in FIG. 1.

First, points corresponding to the road surface (hereinafter referred to as "road points") are selected (or detected) from the point cloud acquired by the LiDAR sensor 500 in step 110 (step 210).

According to the embodiment, the road points may be found by checking the entirety of the point cloud acquired by the LiDAR sensor 500. For example, because respective points of the point cloud have sample indexes (e.g., 0, 1, . . . ) and layer indexes (e.g., 0, 1, . . . , 31), step 210 may be performed using these indexes, but the embodiments are not limited thereto.

After step 210, candidate points for the curb points (hereinafter referred to as "curb candidate points") are detected from among the road points (step 220).

A curb may be classified as a road surface due to a small height difference with the road surface, and thus the following description will be made on the assumption that the curb candidate points are detected from among the road points, but the embodiments are not limited thereto. That is, according to another embodiment, in the case in which the road surface is precisely recognized, curb points may be included in points associated with an object (hereinafter referred to as "object points"), rather than the road points. In this case, the curb candidate points may be detected from among the object points, rather than the road points.

Figure 4:
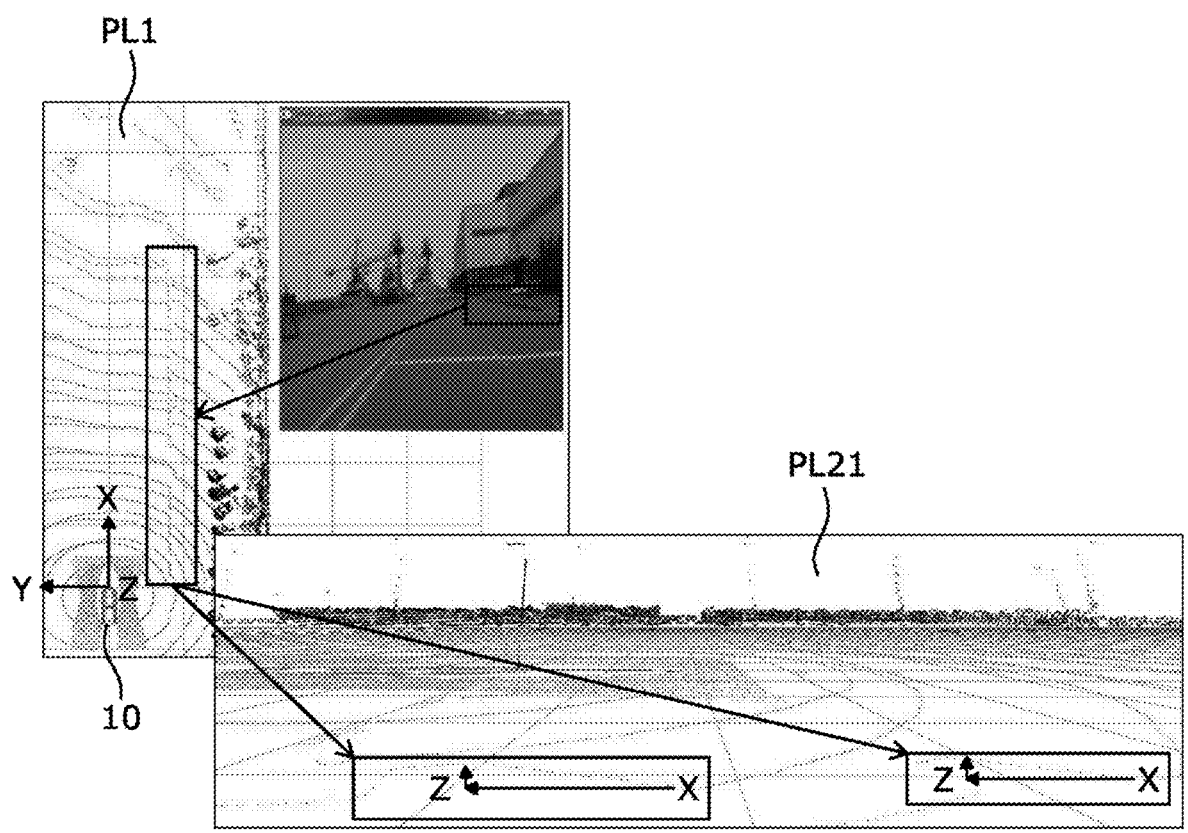
FIG. 4 is a view for helping understanding step 220 shown in FIG. 3.

FIG. 4 is a view for helping understanding step 220 shown in FIG. 3.

The X-axis shown in FIG. 4 is an axis that is parallel to a first direction, which is the direction in which the host vehicle 10 equipped with the LiDAR sensor 500 travels, and is also referred to as a vertical axis. The Y-axis shown in FIG. 4 is an axis that is parallel to a second direction, which intersects the first direction, and is also referred to as a horizontal axis. The Z-axis shown in FIG. 4 is an axis that is parallel to a third direction, which intersects each of the first and second directions.

Hereinafter, as is exemplarily shown in FIG. 4, the plane formed by the X-axis and the Y-axis will be referred to as a "first plane PL1", and the plane formed by the X-axis and the Z-axis will be referred to as a "2-$1^{st}$ plane PL21". Although not illustrated, the plane formed by the Y-axis and the Z-axis will be referred to as a "2-$2^{nd}$ plane PL22". Also, at least one of the 2-$1^{st}$ plane PL21 or the 2-$2^{nd}$ plane PL22 will be referred to as a "second plane". The first plane PL1 may correspond to a plane when viewing the host vehicle 10 from above, and the second plane PL2 may correspond to a plane when viewing the host vehicle 10 from the side.

Referring to FIG. 4, it can be seen that a LiDAR scan pattern for the curb differs from that for the road surface. Specifically, there occurs a phenomenon in which elevation sharply increases in the curb compared to the road surface. Using this phenomenon, the curb candidate points may be detected from among the road points.

According to the embodiment, among the road points, multiple consecutive points that have a constant slope in the first plane PL1 and have a slope having a constant sign in the second plane (e.g., PL21) are detected as the curb candidate points (step 220).

Hereinafter, the slope of a line segment formed by two arbitrary points in the first plane PL1 will be referred to as a "first slope", and the slope of a line segment formed by two arbitrary points in the second plane PL2 (PL21 or PL22) will be referred to as a "second slope".

The state in which the first slope is constant means that the difference between the slopes of line segments interconnecting multiple consecutive points in the first plane is within a predetermined range of permissible values. The state in which the second slope has a constant sign means that the second slope does not have alternating negative (−) and positive (+) signs but has only one of the negative (−) sign and the positive (+) sign in the second plane.

According to the embodiment, unlike the road points, multiple consecutive points, the first slope of which is constant and the second slope of which has a constant sign, may be detected as the curb candidate points.

Hereinafter, an embodiment of step 220 shown in FIG. 3 will be described with reference to the accompanying drawings.

Figure 5:
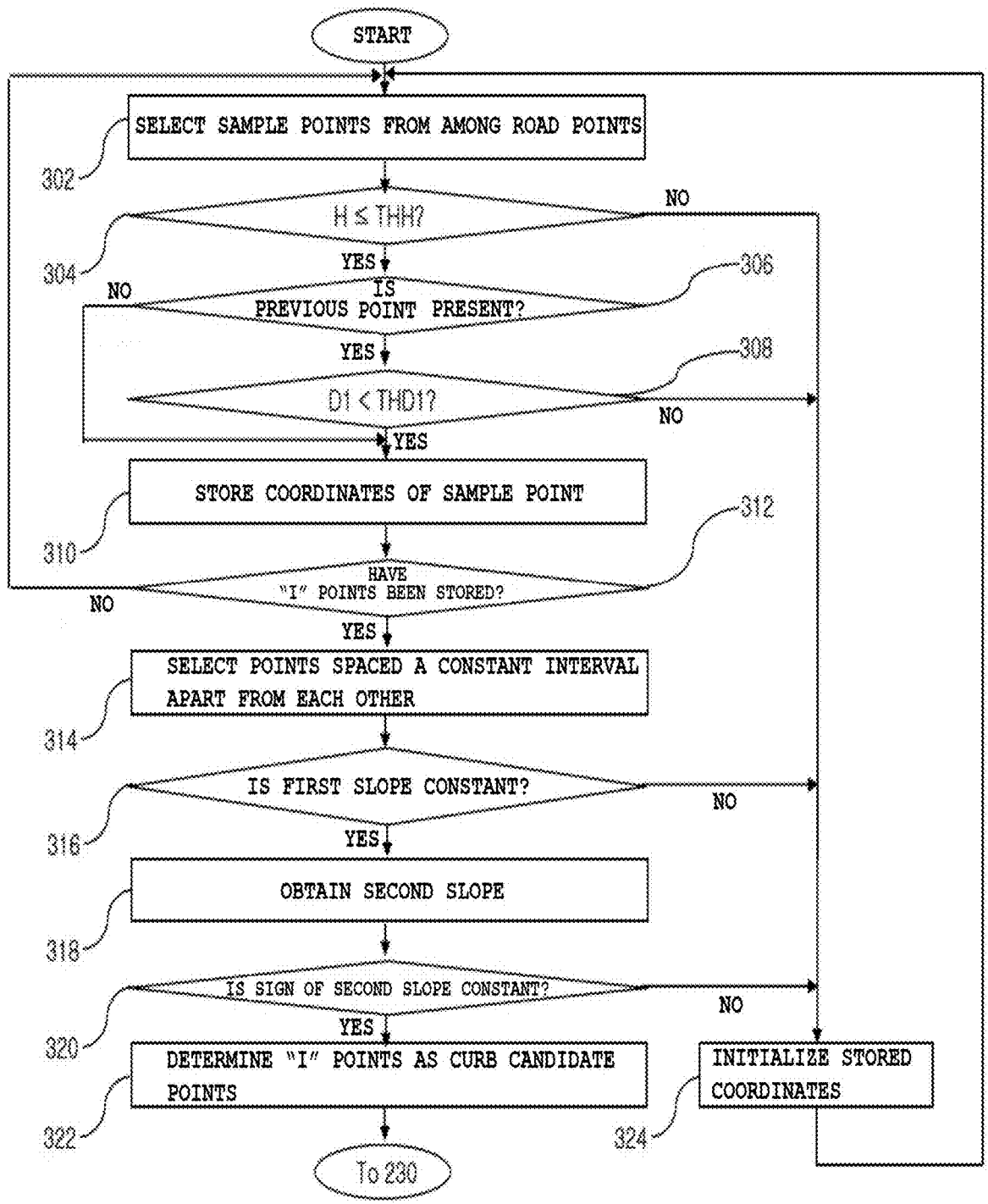
FIG. 5 is a flowchart for explaining an embodiment of step 220 shown in FIG. 3.

FIG. 5 is a flowchart for explaining an embodiment 220A of step 220 shown in FIG. 3.

After step 210, multiple consecutive current points, which have a height H equal to or less than a threshold height THH and from which a first spacing distance D1 to the previous point is below a first threshold distance THD1 (i.e., shorter than the first threshold distance THD1), are found from among the road points, and the coordinates of the current points are stored (steps 302 to 310).

Sample points are sequentially selected from among the road points in the order of the sample index in each layer (step 302). "Current point" is the sample point that is currently selected in step 302, and "previous point" is the sample point that is selected in step 302 at the time point prior to selection of the current point in step 302.

The LiDAR sensor 500 fires a laser while rotating 360°, and receives a laser that returns after being reflected from an object, thereby acquiring points. Here, "sample indexes" are indexes that are assigned to points in the order in which the points are acquired, and "sample index order" is the order in which the indexes are assigned.

After step 302, whether the height H of the selected sample point is equal to or less than the threshold height THH is determined (step 304). Here, the height H of the sample point is a length in the Z-axis direction that can be obtained using the Z-axis coordinate of the sample point. For example, the threshold height THH may be 0.2 m to 0.7 m, and may preferably be 0.5 m. However, the embodiments are not limited to any specific value of threshold height THH. For example, the threshold height THH may be equal to or greater than the height of a curb of a road on which the method 100 and the apparatus 1000 for detecting a curb according to the embodiments are to be used (or the height of a curb as stipulated by traffic regulations).

When the height H of the current point is equal to or less than the threshold height THH, whether a previous point is present is determined (step 306).

When a previous point is not present, the coordinates of the currently selected sample point (i.e., the current point) are stored (step 310).

On the other hand, when a previous point is present, whether the first spacing distance D1 between the current point and the previous point is shorter than the first threshold distance THD1 is determined (step 308). Here, the first threshold distance THD1 may be a variable that varies depending on the coordinates or "rho" of the current point (or the previous point) or a distance, or may be a constant. The term "rho" refers to the radius of a circle in a polar coordinate system. When the host vehicle is the center of a circle in a certain two-dimensional plane, the rho value of a certain point is the straight-line distance between a point formed by orthogonally projecting the corresponding point onto the two-dimensional plane and the center of the circle, that is, the radius of the circle. When the first spacing distance D1 is shorter than the first threshold distance THD1, the coordinates of the current point, which is the currently selected sample point, are stored (step 310). For example, in step 310, the coordinates may be stored in a memory (not shown) named "array".

However, when the height H of the current point is not equal to or less than the threshold height THH in step 304, or when the first spacing distance D1 is not shorter than the first threshold distance THD1 in step 308, the coordinates stored in the array may be initialized and deleted (step 324). After step 324, the process proceeds to step 302 to select the next point as the sample point from among the road points. Thereafter, steps 302 to 310 may be repeatedly performed.

After step 310, whether the number of current points having the coordinates stored in the array is "I" is determined (step 312). Here, "I" is a sample size, and may be a positive integer of 2 or greater.

For example, whenever the coordinates of the sample point are stored in the array in step 310, the sample count may be increased by "1", and step 312 may be performed to determine whether the value of the sample count is "I".

Hereinafter, the embodiments will be described on the assumption that "I" is 4, unless otherwise specified. However, the following description may also apply to the case in which "I" is another value, for example, 8.

When the number of sample points having the coordinates stored in the array is "I", the "I" sample points having the coordinates stored in the array may be determined to be "found multiple consecutive current points", and the process proceeds to step 314.

Thereafter, whether the first slope formed by the multiple (i.e., "I") consecutive current points found in steps 302 to 312 is constant is determined (steps 314 and 316).

Points that are spaced a constant interval Δ apart from each other are selected from among the "I" consecutive current points found by performing steps 302 to 312 (step 314). The points selected in step 314 are not points that are physically spaced apart from each other, but indicate indexing intervals formed by increasing the indexes of the sample points having the stored coordinates to the constant interval Δ.

For example, when eight ("I"=8) consecutive sample points having the coordinates stored in the array, which are found by performing steps 302 to 312, are zeroth to seventh current points, if the constant interval Δ is "1", the zeroth to seventh current points may be selected in step 314. If the constant interval Δ is "2", the zeroth, second, fourth, and sixth current points may be selected, or the first, third, fifth, and seventh current points may be selected in step 314. If the constant interval Δ is "3", the zeroth, third, and sixth current points may be selected, or the first, fourth, and seventh current points may be selected in step 314. Among the current points selected in step 314, the number of current points present between neighboring points may be calculated using Equation 1 below.

$$\Delta - 1 \qquad \qquad \text{Equation 1}$$

Thereafter, whether the first slope formed by the points selected in step 314 is constant is determined (step 316). That is, whether the difference between the slopes of line segments interconnecting the points selected in step 314 is within a predetermined range of permissible values may be determined.

Hereinafter, the slope of a line segment interconnecting neighboring points among the points selected in step 314 will be referred to as a "neighboring slope", and the slope of a line segment interconnecting non-neighboring points among the points selected in step 314 will be referred to as a "non-neighboring slope". In order to determine whether the first slope is constant, whether at least one of the difference between neighboring slopes, the difference between non-neighboring slopes, or the difference between all of the slopes including neighboring and non-neighboring slopes is within a predetermined range of permissible values may be determined (step 316).

For example, when "I" is eight ("I"=8), "Δ" is two ("Δ"=2), and the zeroth, second, fourth, and sixth current points are selected in step 314, the zeroth current point and the second current point are neighboring points, the second current point and the fourth current point are neighboring points, and the fourth current point and the sixth current point are neighboring points. Also, in this case, the zeroth current point and the fourth or sixth current point are non-neighboring points, and the second current point and the sixth current point are non-neighboring points. Therefore, the neighboring slope refers to a slope 02 of the line segment interconnecting the zeroth current point and the second current point, a slope 24 of the line segment interconnecting the second current point and the fourth current point, and a slope 46 of the line segment interconnecting the fourth current point and the sixth current point. Also, the non-neighboring slope refers to a slope 04 of the line segment interconnecting the zeroth current point and the fourth current point, a slope 06 of the line segment interconnecting the zeroth current point and the sixth current point, and a slope 26 of the line segment interconnecting the second current point and the sixth current point.

According to one embodiment, whether the difference between the slope 02, the slope 24, and the slope 46, which are neighboring slopes, is within a predetermined range of permissible values may be determined (step 316).

According to another embodiment, whether the difference between the slope 04, the slope 06, and the slope 26, which are non-neighboring slopes, is within a predetermined range of permissible values may be determined (step 316).

According to still another embodiment, whether the difference between the slope 02, the slope 24, the slope 46, the slope 04, the slope 06, and the slope 26, which are neighboring and non-neighboring slopes, is within a predetermined range of permissible values may be determined (step 316).

In the various embodiments described above in connection with step 316, when the difference between the slopes is not within a predetermined range of permissible values, it may be determined that the first slope is not constant.

When the first slope is not constant, the process proceeds to step 324 to initialize the coordinates stored in the array, and proceeds to step 302 (step 324).

On the other hand, when the first slope is constant, the process proceeds to step 318.

For example, the first slope may be expressed based on the X-axis using Equation 2 below.

$$\text{slope } XY \text{ Angle } [i] = \tan^{-1}\left(\frac{|y[i+j\Delta] - y[i]|}{|x[i+j\Delta] - x[i]|}\right) \times \frac{180}{\pi} \quad \text{Equation 2}$$

Here, "slopeXYAngle[i]" represents a first slope between the $i^{th}$ point and the $i+j\Delta^{th}$ point, among the found multiple consecutive current points, based on the X-axis in the first plane PL1, $0 \leq i \leq I-1$, "x[i]" represents the X-axis coordinate of the $i^{th}$ point, "y[i]" represents the Y-axis coordinate of the $i^{th}$ point, "x[i+j$\Delta$]" represents the X-axis coordinate of the i+j$\Delta^{th}$ point, "y[i+j$\Delta$]" represents the Y-axis coordinate of the i+j$\Delta^{th}$ point, and "j" may be expressed using Equation 3 below.

$$1 \leq j < \frac{I - i}{\Delta} \quad \text{Equation 3}$$

For example, when "j" is 1, "slopeXYAngle[i]" in Equation 2 represents a first slope between the $i^{th}$ point and the i+$\Delta^{th}$ point based on the X-axis in the first plane PL1. When "j" is 2, "slopeXYAngle[i]" represents a first slope between the $i^{th}$ point and the i+2$\Delta^{th}$ point based on the X-axis in the first plane PL1. When "j" is 3, "slopeXYAngle[i]" represents a first slope between the $i^{th}$ point and the i+3$\Delta^{th}$ point based on the X-axis in the first plane PL1.

Thereafter, when the first slope expressed as in Equation 2 satisfies the condition shown in Equation 4 below, the first slope may be determined to be constant.

$$|\text{Slope}XY\text{Angle}[i] - \text{Slope}XY\text{Angle}[i+\Delta]| < SDTH \quad \text{Equation 4}$$

Here, "slopeXYAngle[i+$\Delta$]" represents a first slope between the i+$\Delta^{th}$ point and the i+(j+1)$\Delta^{th}$ point, among the found multiple consecutive current points, in the first plane, and "SDTH" represents a threshold slope value.

On the other hand, when the first slope expressed as in Equation 2 does not satisfy the condition shown in Equation 4, the process proceeds to step 324 to initialize the coordinates stored in the array, and proceeds to step 302 (step 324).

When the first slope is constant, whether the sign of the second slope is constant is determined (steps 318 to 320).

For example, when the first slope is constant with respect to all "i"s, if SlopeXYAngle[i] (where i=0, $\Delta$, ..., and I−2$\Delta$) is equal to or less than a first threshold angle SlopeXYTH, the second slope may be expressed based on the X-axis using Equation 5 below (step 318).

$$\text{Slope } XZ \text{ Angle } [i] = \tan^{-1}\left(\frac{z[i] - z[i+\Delta]}{x[i] - x[i+\Delta]}\right) \times \frac{180}{\pi} \quad \text{Equation 5}$$

Here, "SlopeXZAngle[i]" represents a second slope between the $i^{th}$ point and the i+$\Delta^{th}$ point, among the found multiple consecutive current points, based on the X-axis in the 2-1$^{st}$ plane PL21, "z[i]" represents the Z-axis coordinate of the $i^{th}$ point, "z[i+$\Delta$]" represents the Z-axis coordinate of the i+$\Delta^{th}$ point, and "x[i+$\Delta$]" represents the X-axis coordinate of the i+$\Delta^{th}$ point.

After step 318, whether the sign of the second slope SlopeXZAngle[i] (where i=0, $\Delta$, ..., and I−2$\Delta$) in Equation 5 is constant is determined (step 320). When it is determined that the sign of the second slope SlopeXZAngle[i] is constant, the process proceeds to step 322. Because the neighboring slopes and the non-neighboring slopes need to be checked in order to determine whether the first slope is constant, the variable "j" is used, as shown in Equations 2 and 3. On the other hand, because the non-neighboring slopes do not need to be checked in order to determine whether the sign of the second slope is constant, the variable "j" is not used.

When the sign of the second slope SlopeXZAngle[i] is constant, the multiple ("I" in the case of FIG. 5) consecutive current points found by performing steps 302 to 312 are determined to be the curb candidate points (step 322).

Alternatively, unlike what is illustrated in FIG. 5, when it is determined that the sign of the second slope SlopeXZAngle[i] is constant, whether the second slope SlopeXZAngle[i] satisfies the condition shown in Equation 6 below is determined. When the second slope SlopeXZAngle[i] satisfies the condition shown in Equation 6 below, the process proceeds to step 322.

SlopeXZTH1≤|SlopeXZAngle[i]|≤SlopeXZTH2, or

180°−SlopeXZTH2≤|SlopeXZAngle[i]|≤180°− SlopeXZTH1     Equation 6

Here, "SlopeXZTH1" represents a second threshold angle, and "SlopeXZTH2" represents a third threshold angle.

When the second slope SlopeXZAngle[i] satisfies the condition shown in Equation 6 above, the multiple ("I" in the case of FIG. 5) consecutive current points found by performing steps 302 to 312 are determined to be the curb candidate points (step 322). On the other hand, when the second slope SlopeXZAngle[i] has a constant sign but does not satisfy the condition shown in Equation 6 above, the coordinates stored in the array are initialized (step 324).

Alternatively, when the first slope is constant with respect to all "i"s, if the first slope SlopeXYAngle[i] satisfies the condition shown in Equation 7 below, the second slope may be expressed based on the Y-axis using Equation 8 below (step 318).

$$90° - \text{Slope } XYTH < \text{Slope } XY \text{ Angle } [i] < 90° + \text{Slope } XYTH \quad \text{Equation 7}$$

$$\text{Slope } YZ \text{ Angle } [i] = \tan^{-1}\left(\frac{z[i] - z[i+\Delta]}{y[i] - y[i+\Delta]}\right) \times \frac{180}{\pi} \quad \text{Equation 8}$$

Here, "SlopeYZAngle[i]" represents a second slope between the $i^{th}$ point and the $i+\Delta^{th}$ point, among the found multiple consecutive current points, in the $2\text{-}2^{nd}$ plane PL22, and "y[i+$\Delta$]" represents the Y-axis coordinate of the $i+\Delta^{th}$ point.

Whether the sign of the second slope SlopeYZAngle[i] (where i=0, $\Delta$, . . . , and I–2$\Delta$) in Equation 8 is constant is determined (step 320). When it is determined that the sign of the second slope SlopeYZAngle[i] is constant, the process proceeds to step 322. When the second slope SlopeYZAngle [i] has a constant sign, the multiple ("I" in the case of FIG. 5) consecutive current points found by performing steps 302 to 312 are determined to be the curb candidate points (step 322).

Alternatively, unlike what is illustrated in FIG. 5, when it is determined that the sign of the second slope SlopeYZ-Angle[i] is constant, whether the second slope SlopeYZAngle[i] satisfies the condition shown in Equation 9 below is determined. When the second slope SlopeYZAngle[i] satisfies the condition shown in Equation 9 below, the process proceeds to step 322.

SlopeYZTH1≤|SlopeYZAngle[i]|≤SlopeYZTH2, or

180°−SlopeYZTH2≤|SlopeYZAngle[i]|≤180−
   SlopeYZTH1                                                    Equation 9

Here, "SlopeYZTH1" represents a fourth threshold angle in the $2\text{-}2^{nd}$ plane PL22, and "SlopeYZTH2" represents a fifth threshold angle in the $2\text{-}2^{nd}$ plane PL22.

When the second slope SlopeYZAngle[i] satisfies the condition shown in Equation 9 above, the multiple ("I" in the case of FIG. 5) consecutive current points found by performing steps 302 to 312 are determined to be the curb candidate points (step 322). On the other hand, when the second slope SlopeYZAngle[i] has a constant sign but does not satisfy the condition shown in Equation 9 above, the coordinates stored in the array are initialized (step 324).

According to the embodiment, when the first slope is constant with respect to all "i"s, if SlopeXYAngle[i] (where i=0, $\Delta$, . . . , and I–2$\Delta$) is equal to or less than the first threshold angle SlopeXYTH, a flag may be assigned a value of "1". Also, when the first slope is constant with respect to all "i"s, if the first slope SlopeXYAngle[i] (where i=0, $\Delta$, . . . , and I–2$\Delta$) satisfies the condition shown in Equation 7 above, the flag may be assigned a value of "2".

Thereafter, when the flag is "1", the second slope may be obtained using Equation 5, and when the flag is "2", the second slope may be obtained using Equation 8.

However, while the first slope is constant with respect to all "i"s, if the first slope SlopeXYAngle[i] is not equal to or less than the first threshold angle SlopeXYTH and if the first slope SlopeXYAngle[i] does not satisfy the condition shown in Equation 7, the process proceeds to step 324 to initialize the coordinates stored in the array (step 324).

Referring again to FIG. 3, as described above, points other than the curb points (hereinafter referred to as "non-curb points") may be detected from among the curb candidate points detected in step 220 (steps 230, 240, and 250).

Hereinafter, a step of detecting non-curb points from among the curb candidate points (hereinafter referred to as an "error verification step") will be described with reference to the accompanying drawings.

After step 220, when multiple points (hereinafter referred to as "neighboring points") located in a layer (hereinafter referred to as a "neighboring layer") that is adjacent to a layer (hereinafter referred to as a "candidate layer") in which the curb candidate points are located are object points (e.g., points associated with another vehicle or a wall), rather than the road points (hereinafter referred to as "non-road points"), a first error verification step may be performed to verify (or detect) whether the curb candidate points are non-curb points based on the variance and average of the coordinates of the multiple neighboring points (step 230).

According to the embodiment, when the first error verification step is performed, an azimuth may be considered. Here, the azimuth is the angular position of a point measured clockwise along a circle centered on the host vehicle. In the case of considering the azimuth, when multiple points located in the vicinity of the azimuth at which the curb candidate points are located among the neighboring points are non-road points, the first error verification step may be performed to determine the curb candidate points to be the non-curb points based on the variance and average of the coordinates of the multiple non-road points (step 230).

As such, the first error verification step serves to eliminate the curb candidate points detected in association with an object other than the road surface. The road points may be detected from among the points associated with an object (e.g., another vehicle or a wall), and accordingly, the curb candidate points may be detected from the object. Therefore, in order to eliminate the erroneously detected points, the first error verification step may be performed.

Figure 6:
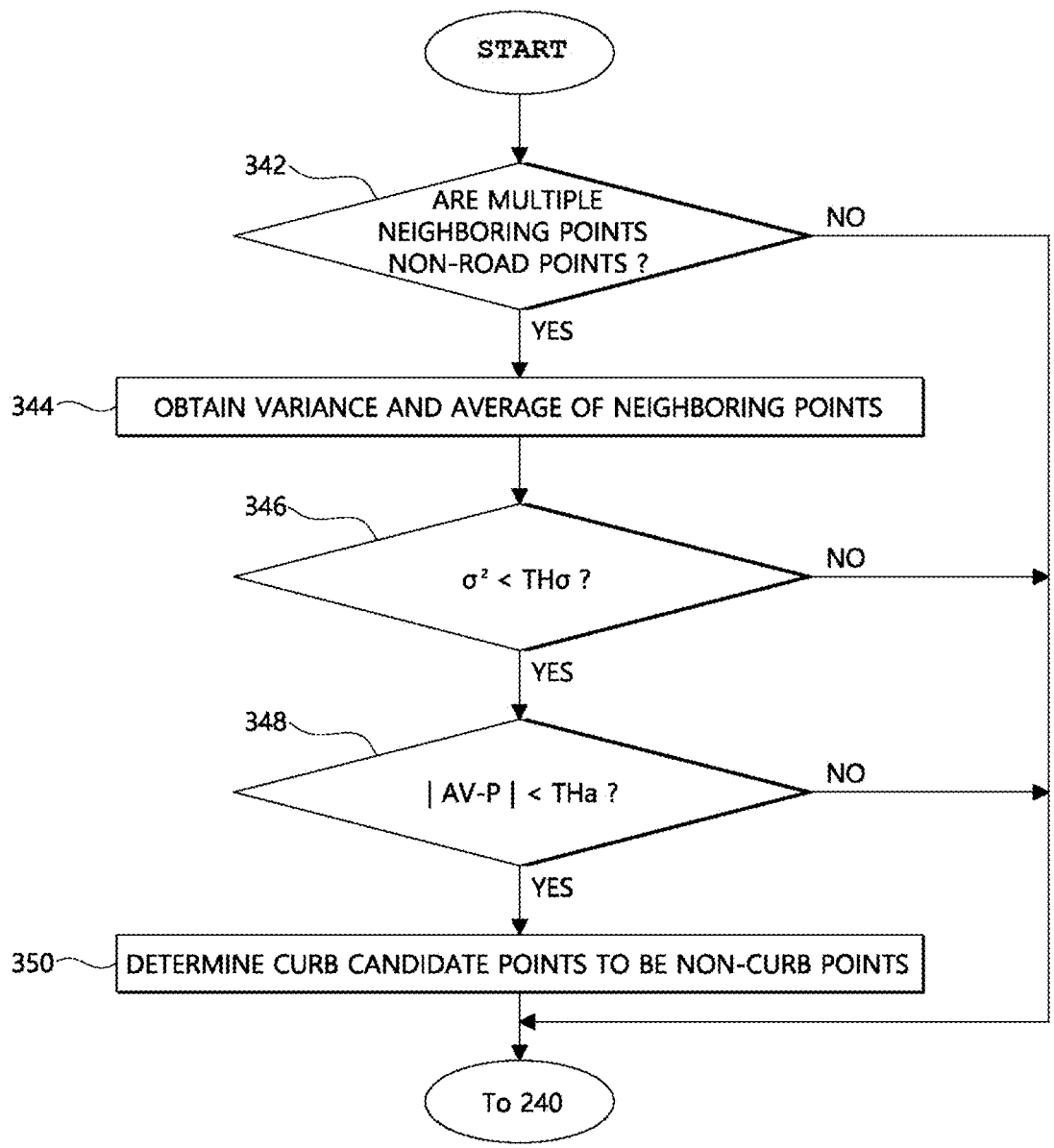
FIG. 6 is a view for explaining an embodiment of step 230 shown in FIG. 3.

FIG. 6 is a view for explaining an embodiment 230A of step 230 shown in FIG. 3.

Figure 7:
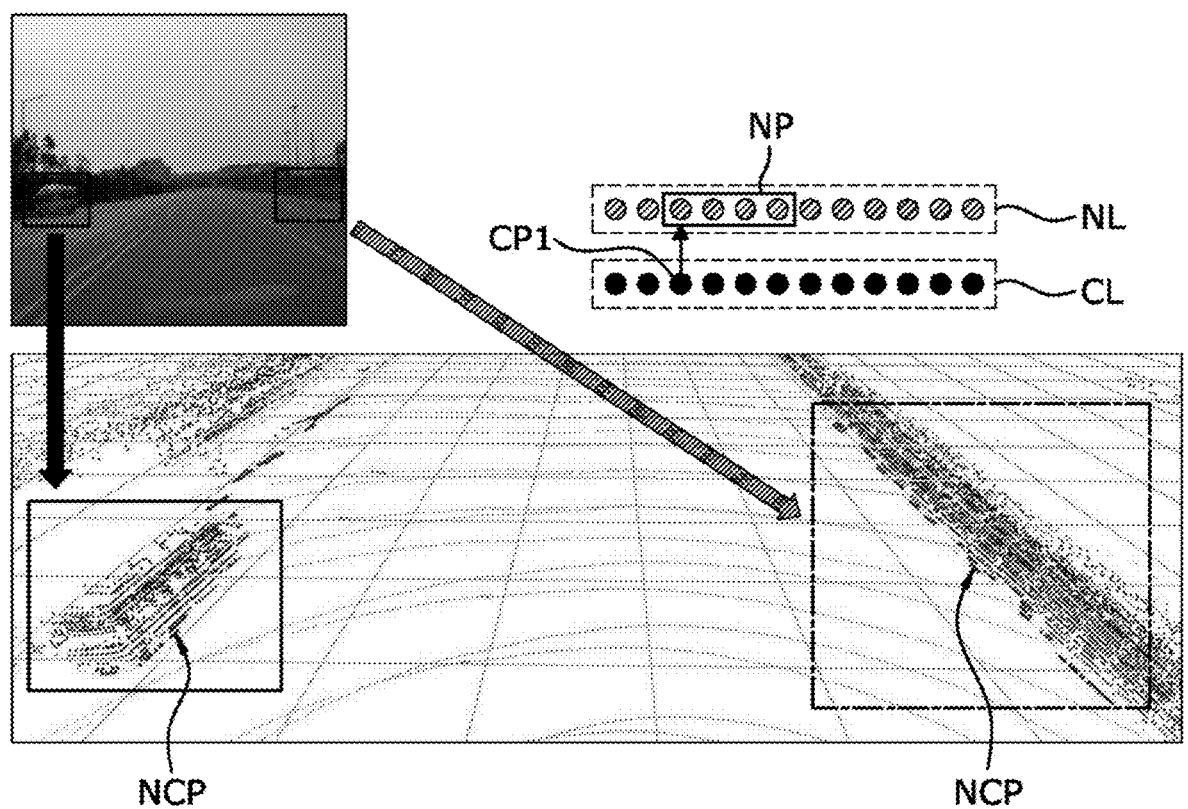
FIG. 7 is a view for helping understanding step 230A shown in FIG. 6.

FIG. 7 is a view for helping understanding step 230A shown in FIG. 6. FIG. 7 shows neighboring points NP located in the neighboring layer NL and curb candidate points located in the candidate layer CL. Multiple (e.g., "I") neighboring points NP may be selected, unlike what is illustrated in FIG. 7. That is, according to an application example of the embodiment, the "I" points located sequentially from the front of the neighboring layer NL, the "I" points located sequentially from the rear of the neighboring layer NL, or the "I" points located in the middle of the neighboring layer NL may be selected as the neighboring points NP.

Step 230A shown in FIG. 6 may be performed on curb candidate points (hereinafter referred to as "horizontal candidate points"), the slope of which is closer to the Y-axis (or the horizontal axis) than to the X-axis (or the vertical axis), and may also be performed on curb candidate points (hereinafter referred to as "vertical candidate points"), the slope of which is closer to the X-axis than to the Y-axis. Accordingly, step 230A shown in FIG. 6 may correspond to a $1\text{-}1^{st}$ error verification step of determining whether the vertical candidate points are non-curb points, rather than curb points, and may also correspond to a $1\text{-}2^{nd}$ error verification step of determining whether the horizontal candidate points are non-curb points, rather than curb points.

After step 220, whether the multiple neighboring points are non-road points is determined (step 342). For example, referring to FIG. 7, whether the neighboring points NP in the neighboring layer NL, which is adjacent to the candidate layer CL in which the curb candidate points CP1 are located, are non-road points may be determined (step 342).

According to the embodiment, the neighboring layer in which the neighboring points are located may be a layer that has the same azimuth as the candidate layer in which the curb candidate points are located, but the embodiments are not limited thereto.

When step 230A shown in FIG. 6 is the 1-$1^{st}$ or 1-$2^{nd}$ error verification step, whether the [(SIdx+i)*N+ALIdx]$^{th}$ point is a non-road point, rather than a road point, may be determined in step 342. Here, "SIdx" represents the sample index of the curb candidate point. The sample index is generated when the points in one layer are stored in the form of an array A (A[0], A[1], ..., A[M]). That is, in the array A, "[0], [i], ..., [M]" corresponds to the sample index. Here, "i" may be a positive or negative number, may be greater than "I−1", and may be variously set depending on the application example of the embodiment. For example, $0 \le i \le I-1$. "N" represents the total number of layers, and "ALIdx" represents the index of a neighboring layer that has the same azimuth as the candidate layer, or represents the index of a neighboring layer that does not have the same azimuth as the candidate layer.

When it is determined that the multiple neighboring points are not non-road points, whether the curb candidate points are non-curb points is no longer verified in each of the 1-$1^{st}$ and 1-$2^{nd}$ error verification steps.

On the other hand, when the multiple neighboring points are non-road points, the coordinates of the multiple neighboring points are collected, and the average and variance of the collected coordinates are obtained (step 344). Here, the number of neighboring points that are collected may be equal to or different from the number I of curb candidate points.

For example, when the neighboring points NP shown in FIG. 7 are non-road points, the coordinates of four neighboring points NP may be collected, and the variance and average of the collected coordinates may be obtained.

When step 230A shown in FIG. 6 is the 1-$1^{st}$ or 1-$2^{nd}$ error verification step, the 1-$1^{st}$ or 1-$2^{nd}$ error verification may be performed using the average and variance of the X-axis and Y-axis coordinates of the collected multiple neighboring points.

According to one embodiment, when step 230A shown in FIG. 6 is the 1-$1^{st}$ error verification step, the variance of the Y-axis coordinates of the multiple neighboring points (e.g., NP) and the average of the Y-axis coordinates of the multiple neighboring points (e.g., NP) are obtained (step 344). However, when step 230A shown in FIG. 6 is the 1-$2^{nd}$ error verification step, the variance of the X-axis coordinates of the multiple neighboring points (e.g., NP) and the average of the X-axis coordinates of the multiple neighboring points (e.g., NP) are obtained (step 344).

According to another embodiment, when step 230A shown in FIG. 6 is the 1-$1^{st}$ or 1-$2^{nd}$ error verification step, the X-axis coordinates and the Y-axis coordinates may be assigned weights to obtain the variance and average thereof. That is, when the angle formed by the consecutive curb candidate points and the X-axis or the Y-axis is 0 degrees, only the Y-axis coordinates or the X-axis coordinates of the neighboring points may be used to obtain the average and variance thereof. However, when the angle formed by the consecutive curb candidate points and the X-axis or the Y-axis is not 0 degrees, a weighted sum of a product of multiplying the Y-axis coordinates by a weight W1 and a product of multiplying the X-axis coordinates by a weight W2 may be used to obtain the average and variance thereof, as shown in Equation 10 below.

$$W1 \times Y\text{-axis coordinates} + W2 \times X\text{-axis coordinates} \quad \text{Equation 10}$$

Here, each of the weights W1 and W2 has a value ranging from 0 to 1.

For example, when the angle formed by the consecutive curb candidate points and the X-axis is 30 degrees, W1 may be determined to be ⅔, and W2 may be determined to be ⅓ in Equation 10.

After step 344, whether the variance $\sigma^2$ is less than a threshold variance THσ may be determined (step 346). For example, the threshold variance THσ may be 0.1 m to 0.2 m, and may preferably be 0.15 m. However, the embodiments are not limited thereto.

The threshold variance THσ in the 1-$1^{st}$ error verification step and the threshold variance THσ in the 1-$2^{nd}$ error verification step may be set to be different from each other, or may be set to be equal to each other.

Alternatively, like Equation 10 described above, in which a weight is given depending on the angle formed by the consecutive curb candidate points and the X-axis or the Y-axis, the threshold variance THσ may also be given a weight and may vary depending on the angle.

When the variance $\sigma^2$ is less than the threshold variance THσ, whether a first absolute value is less than a threshold average THa is determined as shown in Equation 11 below (step 348).

$$|AV-P| < THa \quad \text{Equation 11}$$

Here, "|AV−P|" represents the first absolute value, "AV" represents the average obtained in step 344, and "P" represents the coordinates of the curb candidate points.

When step 230A shown in FIG. 6 is the 1-$1^{st}$ error verification step, "P" represents the Y-axis coordinates of the vertical candidate points. When step 230A shown in FIG. 6 is the 1-$2^{nd}$ error verification step, "P" represents the X-axis coordinates of the horizontal candidate points. Alternatively, like Equation 10 described above, in which a weight is given depending on the angle formed by the consecutive curb candidate points and the X-axis or the Y-axis, "P" in Equation 11 may be the coordinates of a weighted sum of products of multiplying the X-axis coordinates and the Y-axis coordinates by weights.

For example, the threshold average THa may be 0.1 m to 0.2 m, and may preferably be 0.15 m. However, the embodiments are not limited thereto.

The threshold average THa in the 1-$1^{st}$ error verification step and the threshold average THa in the 1-$2^{nd}$ error verification step may be set to be different from each other, or may be set to be equal to each other.

Alternatively, like Equation 10 described above, in which a weight is given depending on the angle formed by the consecutive curb candidate points and the X-axis or the Y-axis, the threshold average THa may also be given a weight and may vary depending on the angle.

When the first absolute value in Equation 11 is less than the threshold average THa, the curb candidate points (i.e., the vertical candidate points or the horizontal candidate points) are determined to be non-curb points, rather than curb points (step 350). For example, the curb candidate points shown in FIG. 7 may be determined to be non-curb points NCP by performing the first error verification step.

On the other hand, when the variance $\sigma^2$ is not less than the threshold variance TH$\sigma$, or when the first absolute value is not less than the threshold average THa, whether the curb candidate points are non-curb points is no longer verified in each of the 1-$1^{st}$ and 1-$2^{nd}$ error verification steps.

Although it is illustrated in FIG. 6 that step 348 is performed after step 346 is performed, the embodiments are not limited thereto. That is, according to another embodiment, unlike what is illustrated in FIG. 6, step 346 may be performed after step 348 is performed, or step 346 and step 348 may be performed at the same time.

As a result, in the first error verification step, when the variance $\sigma^2$ of the coordinates of a certain number of neighboring points (e.g., as many as the sample size I) is less than the threshold variance TH$\sigma$, this means that the neighboring points are points belonging to a flat object, such as a vehicle or a wall, and when the first absolute value of the difference between the average of the coordinates of the neighboring points and the coordinates of the curb candidate points is less than the threshold average THa, this means that the curb candidate points are strongly associated with an object such as a wall or a vehicle. Accordingly, it can be regarded that the non-curb points associated with an object such as another vehicle or a wall are erroneously detected as curb candidate points (step 350).

Referring again to FIG. 3, after step 230, using a reference line segment RL, which is formed by curb candidate points belonging to an arbitrary layer (hereinafter referred to as an "arbitrary candidate layer"), and a target line segment TL, which is formed by curb candidate points belonging to a layer that is adjacent to the arbitrary candidate layer (hereinafter referred to as a "neighboring candidate layer"), the second error verification step may be performed to detect non-curb points, rather than curb points, from among the curb candidate points belonging to the arbitrary candidate layer (step 240).

In this way, in the second error verification step, the curb candidate points that are not detected in multiple layers at the same time are regarded as non-curb points, and are eliminated.

Similar to the first error verification step, the second error verification step may also be performed on each of the vertical candidate points and the horizontal candidate points.

Figure 8:
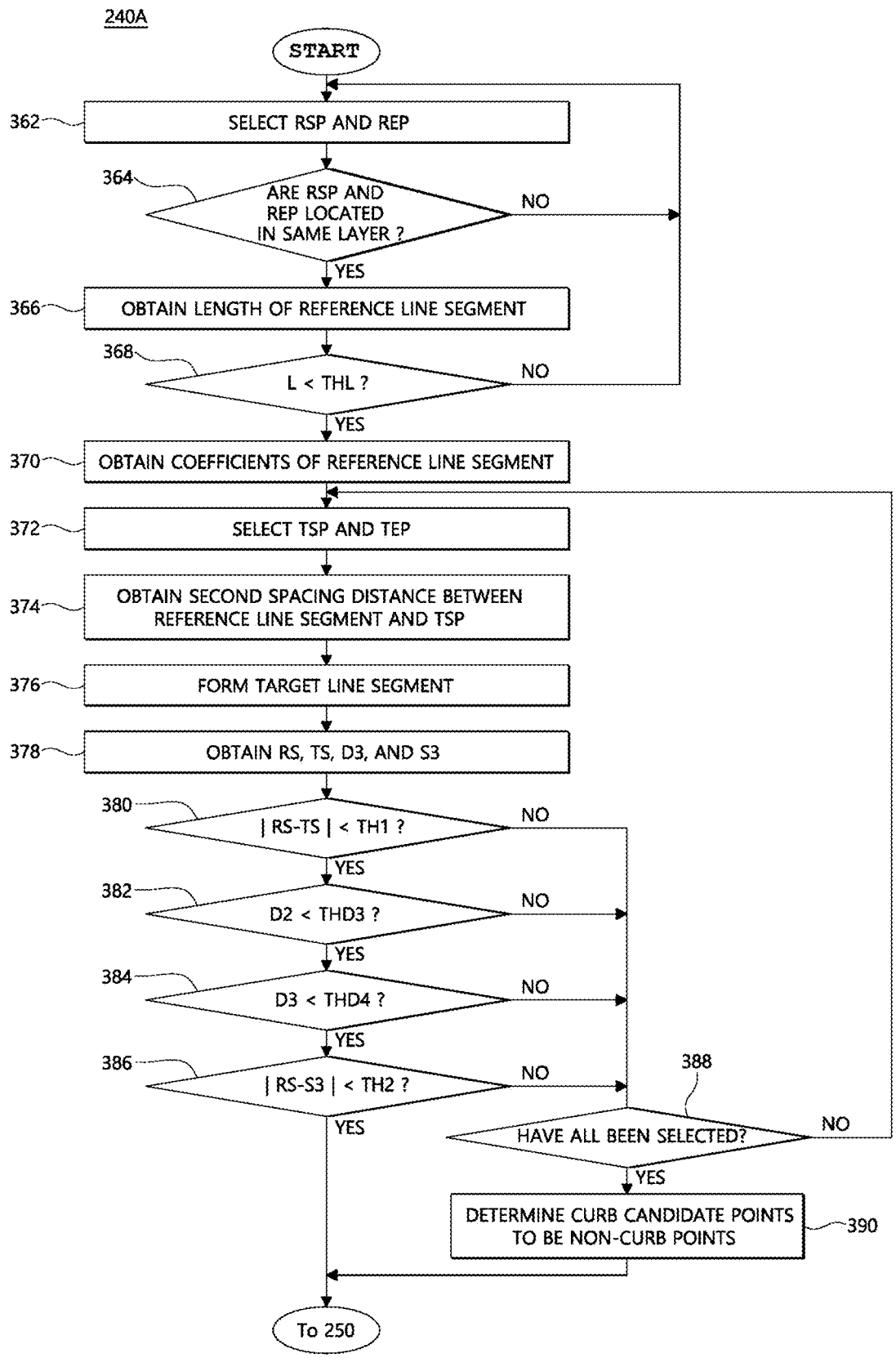
FIG. 8 is a view for explaining an embodiment of step 240 shown in FIG. 3.

FIG. 8 is a view for explaining an embodiment 240A of step 240 shown in FIG. 3.

Figure 9:
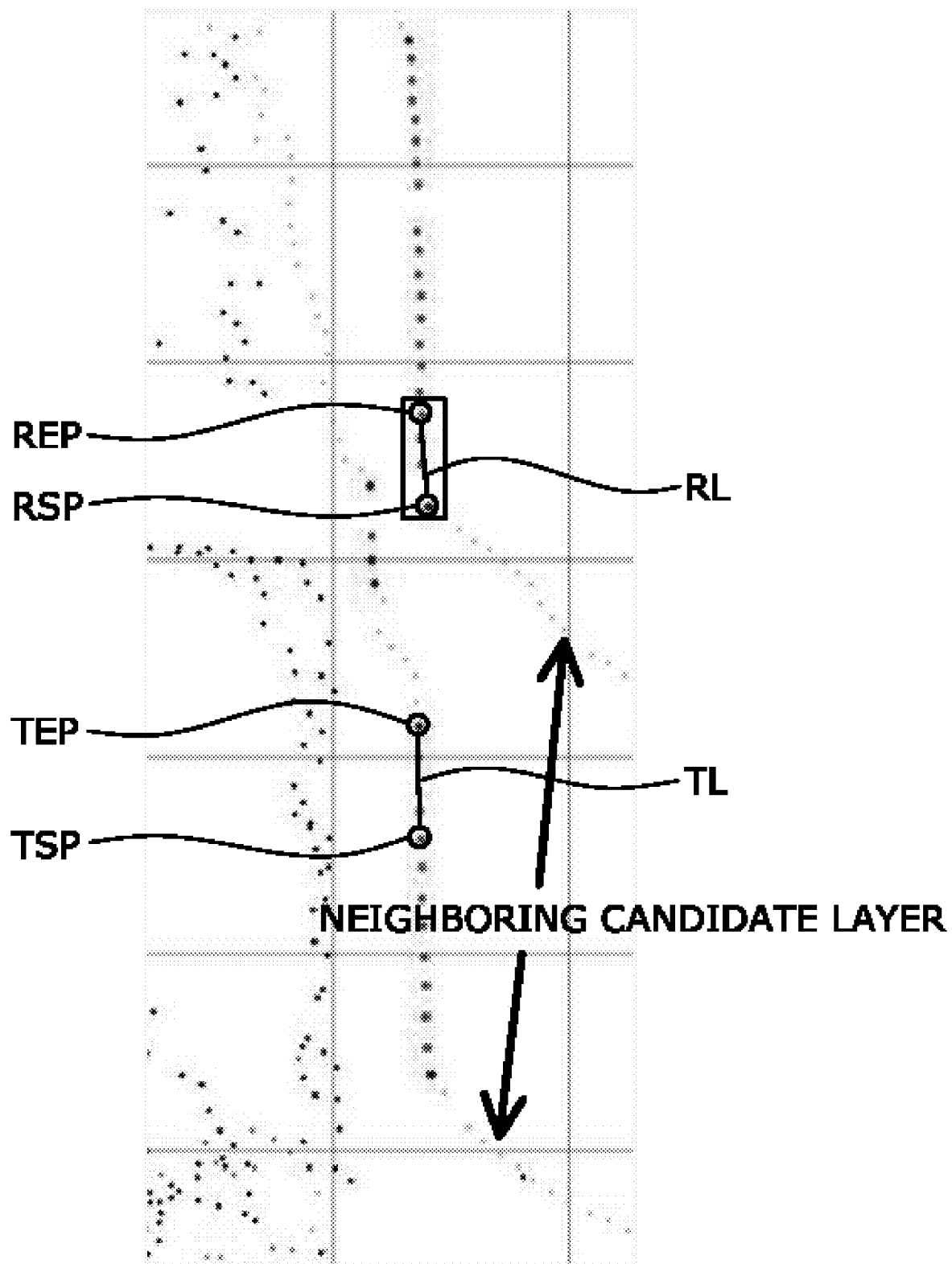
FIGS. 9 and 10 are views for helping understanding step 240A shown in FIG. 8.
Figure 10:
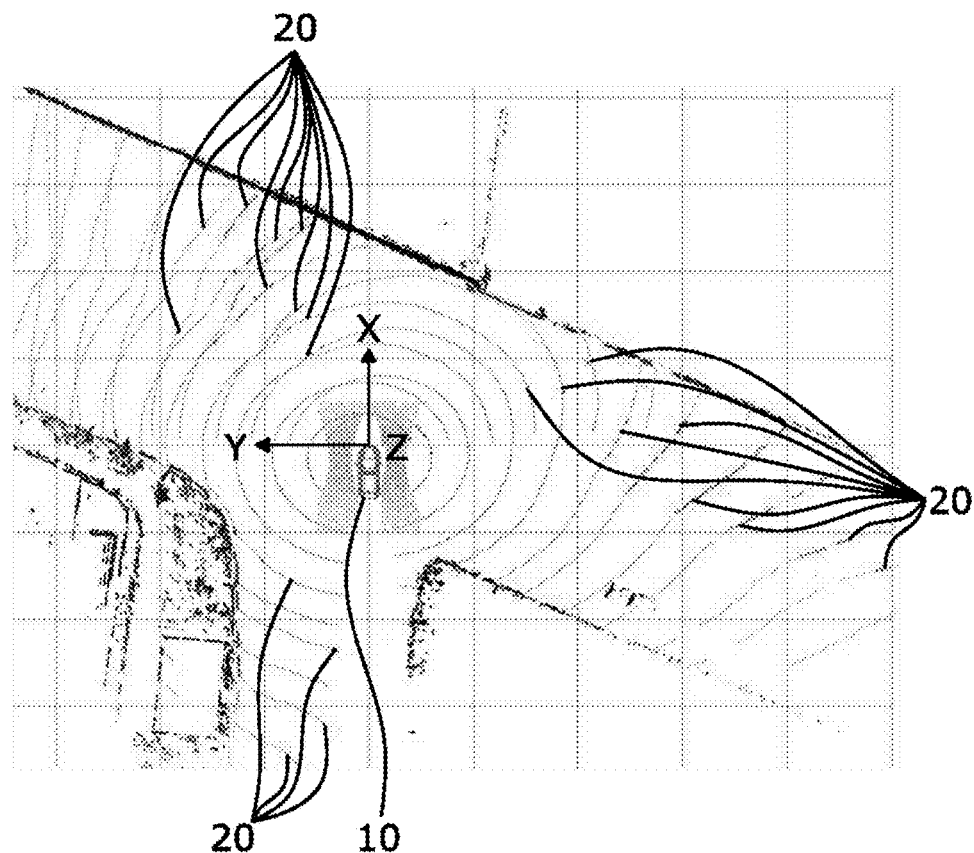

FIGS. 9 and 10 are views for helping understanding step 240A shown in FIG. 8.

After step 230, a reference start point RSP and a reference ending point REP for forming the reference line segment RL are selected from among the curb candidate points belonging to the arbitrary candidate layer (step 362). For example, the first found curb candidate point in the arbitrary candidate layer may be selected as the reference start point RSP, and a point having an index, which is obtained by adding the value expressed in Equation 12 below to an index obtained when selecting the reference start point, may be selected as the reference ending point REP.

$$I-1 \qquad \text{Equation 12}$$

After step 362, whether the reference start point RSP and the reference ending point REP are located in the same layer is determined (step 364). This may be performed by checking the layer index. That is, whether the layer index of the reference start point RPS and the layer index of the reference ending point REP are the same as each other may be determined.

When the reference start point RSP and the reference ending point REP are located in the same layer, the length of the reference line segment RL, which is formed by interconnecting the reference start point RSP and the reference ending point REP, is obtained using Equation 13 below (step 366).

$$L=\sqrt{(REP[x]-RSP[x])^2(REP[y]-RSP[y])^2} \qquad \text{Equation 13}$$

Here, "L" represents the length of the reference line segment RL, "REP[x]" represents the X-axis coordinate of the reference ending point REP, "REP[y]" represents the Y-axis coordinate of the reference ending point REP, "RSP [x]" represents the X-axis coordinate of the reference start point RSP, and "RSP[y]" represents the Y-axis coordinate of the reference start point RSP.

According to another embodiment, unlike what is illustrated in FIG. 8, step 364 may be performed after step 366 is performed. In this case, step 366 is performed after step 362, step 364 is performed after step 366, and when the reference start point RSP and the reference ending point REP are located in the same layer, step 368 is performed.

After step 366, whether the length L of the reference line segment RL is shorter than a threshold length THL is determined (step 368). For example, the threshold length THL may be 1 m to 3 m, and may preferably be 2 m. However, the embodiments are not limited thereto.

When the reference start point RSP and the reference ending point REP are not located in the same layer, or when the length L of the reference line segment RL is not shorter than the threshold length THL, the process proceeds to step 362 to re-select the reference start point RSP and the reference ending point REP (step 362), and steps 364 to 368 are repeatedly performed.

On the other hand, when the reference start point RSP and the reference ending point REP are located in the same layer and when the length L of the reference line segment RL is shorter than the threshold length THL, coefficients a, b, and c of the equation of a straight line of the reference line segment RL, which is formed by interconnecting the reference start point RSP and the reference ending point REP, are obtained (step 370). The equation of a straight line of the reference line segment RL may be expressed using Equation 14 below.

$$ax+by+c=0 \qquad \text{Equation 14}$$

Although it is illustrated in FIG. 8 that steps 366 and 368 are performed after step 364 is performed, the embodiments are not limited thereto. That is, according to another embodiment, unlike what is illustrated in FIG. 8, step 364 may be performed after steps 366 and 368 are performed, or steps 366 and 368 may be performed at the same time that step 364 is performed.

After step 370, a target start point TSP and a target ending point TEP for forming the target line segment TL are selected (step 372). For example, curb candidate points may be found in the neighboring candidate layer, which has a layer index that is larger or smaller than the index of the arbitrary candidate layer by "1", and the first found curb candidate point may be selected as the target start point TSP. Also, among the curb candidate points present in the same layer as the target start point TSP, a point that is located within a second threshold distance THD2 from the target start point TSP may be selected as the target ending point TEP. For example, the second threshold distance THD2 may be 1 m to 3 m, and may preferably be 2 m. However, the embodiments are not limited thereto.

After step 372, a second spacing distance between the reference line segment RL and the target start point TSP is obtained using the coordinates of the target start point TSP for forming the target line segment TL and the coefficients a, b, and c, among the curb candidate points belonging to the neighboring candidate layer (step 374). For example, the second spacing distance D2 may be obtained using Equation 15 below.

$$D2 = \frac{|ax_1 + by_1 + c|}{\sqrt{a^2 + b^2}} \quad \text{Equation 15}$$

Here, "$x_1$" and "$y_1$" respectively represent the X-axis coordinate and the Y-axis coordinate of the target start point TSP.

For example, after step 374, the target line segment TL interconnecting the target start point TSP and the target ending point TEP may be formed (step 376).

After step 376, a reference slope RS of the reference line segment RL, a target slope TS of the target line segment TL, a third spacing distance D3 between the reference start point RSP and the target start point TSP, and a third slope S3 of a line segment (or a straight line) interconnecting the target start point TSP and the reference ending point REP are obtained (step 378).

For example, the reference slope RS may be obtained using Equation 16 below, the target slope TS may be obtained using Equation 17 below, the third spacing distance D3 may be obtained using Equation 18 below, and the third slope S3 may be obtained using Equation 19 below.

$$RS = \tan^{-1}\frac{REP[y] - RSP[y]}{REP[x] - RSP[x]} \quad \text{Equation 16}$$

$$TS = \tan^{-1}\frac{TEP[y] - TSP[y]}{TEP[x] - TSP[x]} \quad \text{Equation 17}$$

Here, "TEP[x]" represents the X-axis coordinate of the target ending point TEP, "TEP[y]" represents the Y-axis coordinate of the target ending point TEP, "TSP[x]" represents the X-axis coordinate of the target start point TSP, and "TSP[y]" represents the Y-axis coordinate of the target start point TSP.

$$D3 = \sqrt{(RSP[x] - TSP[x])^2 + (RSP[y] - TSP[y])^2} \quad \text{Equation 18}$$

$$S3 = \tan^{-1}\frac{TSP[y] - REP[y]}{TSP[x] - REP[x]} \quad \text{Equation 19}$$

After step 378, non-curb points are found from among the curb candidate points belonging to the arbitrary candidate layer using at least one of the reference slope RS, the target slope TS, the second and third spacing distances D2 and D3, or the third slope S3 (steps 380 to 390).

Whether a second absolute value of the difference between the reference slope RS and the target slope TS is less than a first threshold value TH1 is determined using Equation 20 below (step 380).

$$|RS-TS| < TH1 \quad \text{Equation 20}$$

Here, "|RS−TS|" represents the second absolute value. For example, the first threshold value TH1 may be 1° to 10°, and may preferably be 5°. However, the embodiments are not limited thereto.

When the second absolute value in Equation 20 is less than the first threshold value TH1, whether the second spacing distance D2 is shorter than a third threshold distance THD3 is determined (step 382). For example, the third threshold distance THD3 may be greater than 0 m and less than 5 m, and may preferably be 1 m. However, the embodiments are not limited thereto.

When the second spacing distance D2 is shorter than the third threshold distance THD3, whether the third spacing distance D3 is shorter than a fourth threshold distance THD4 is determined (step 384). For example, the fourth threshold distance THD4 may be 5 m to 15 m, and may preferably be 10 m. However, the embodiments are not limited thereto.

When the third spacing distance D3 is shorter than the fourth threshold distance THD4, whether a third absolute value of the difference between the reference slope RS and the third slope S3 is less than a second threshold value TH2 is determined using Equation 21 below (step 386).

$$|RS-S3| < TH2 \quad \text{Equation 21}$$

Here, "|RS−S3|" represents the third absolute value. For example, the second threshold value TH2 may be 1° to 10°, and may preferably be 5°. However, the embodiments are not limited thereto.

When the third absolute value is less than the second threshold value TH2, it is not determined that the curb candidate points belonging to the arbitrary candidate layer are non-curb points. That is, when the second absolute value is less than the first threshold value TH1, when the second spacing distance D2 is shorter than the third threshold distance THD3, when the third spacing distance D3 is shorter than the fourth threshold distance THD4, and when the third absolute value is less than the second threshold value TH2, it is not determined that the curb candidate points belonging to the arbitrary candidate layer are non-curb points, and the process proceeds to step 250.

However, when the second absolute value is equal to or greater than the first threshold value TH1, when the second spacing distance D2 is equal to or longer than the third threshold distance THD3, when the third spacing distance D3 is equal to or longer than the fourth threshold distance THD4, or when the third absolute value is equal to or greater than the second threshold value TH2, whether both the target start point TSP and the target ending point TEP have been selected in the neighboring candidate layer is determined (step 388). When the target start point TSP and the target ending point TEP have not been selected in the neighboring candidate layer, the process proceeds to step 372 to re-select the target start point TSP and the target ending point TEP.

However, when both the target start point TSP and the target ending point TEP have been selected in the neighboring candidate layer, it is determined that the curb candidate points belonging to the arbitrary candidate layer are non-curb points (step 390).

Steps 380 to 390 shown in FIG. 8 may be performed a number of times equal to the sample size "I".

Referring to FIG. 10, it can be seen that the non-curb points 20 are eliminated from among the curb candidate points by performing the above-described second error verification step.

Referring again to FIG. 3, it is illustrated that the second error verification step (step 240) is performed after the first error verification step (step 230) is performed, but the embodiments are not limited thereto. That is, according to another embodiment, the first error verification step (step 230) may be performed after the second error verification step (step 240) is performed, or the first error verification step (step 230) and the second error verification step (step 240) may be performed at the same time.

After the first error verification step (step 230) and the second error verification step (step 240) are performed, a third error verification step is performed to finally determine the points that remain after eliminating the non-curb points from among the curb candidate points to be curb points using points FSP located in a free space (step 250). Here, the points FSP located in the free space refer to points in a place in which the first non-line of sight (NLOS) is generated.

For example, the points FSP may be detected by performing clustering. Alternatively, according to an application example of the embodiment, the points FSP may be detected independently of clustering.

In this way, in the third error verification step, when the curb candidate points are close to the NLOS points, the curb candidate points are regarded as non-curb points associated with an object such as another vehicle or a wall, and are eliminated.

Figure 11:
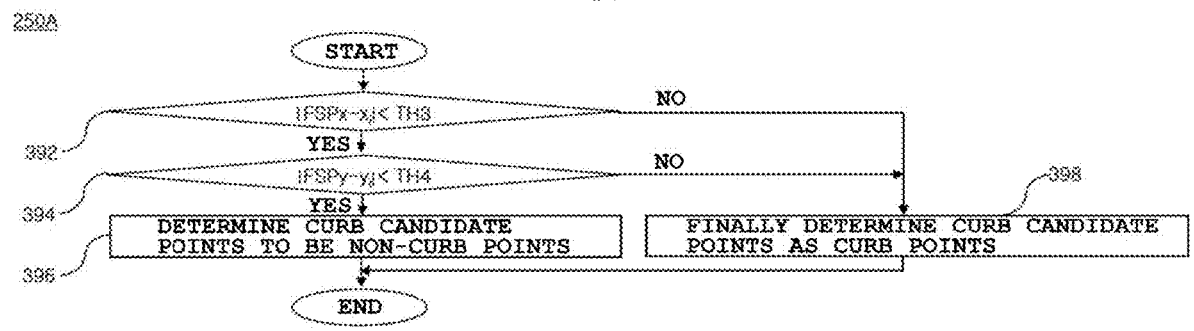
FIG. 11 is a view for explaining an embodiment of step 250 shown in FIG. 3.

FIG. 11 is a view for explaining an embodiment 250A of step 250 shown in FIG. 3.

FIGS. 12A to 12C are views for helping understanding step 250A shown in FIG. 11.

After step 240, whether the absolute value of the difference between the X-axis coordinates FSPx of the points FSP located in the free space shown in FIG. 12A and the X-axis coordinates $x_i$ of the curb candidate points is less than a third threshold value TH3 is determined using Equation 22 below (step 392).

$$|FSPx - x_i| < TH3 \qquad \text{Equation 22}$$

When the absolute value of the coordinate difference in Equation 22 is less than the third threshold value TH3, whether the absolute value of the difference between the Y-axis coordinates FSPy of the points FSP located in the free space and the Y-axis coordinates $y_i$ of the curb candidate points is less than a fourth threshold value TH4 is determined using Equation 23 below (step 394).

$$|FSPy - y_i| < TH4 \qquad \text{Equation 23}$$

The third threshold value TH3 and the fourth threshold value TH4 may be equal to or different from each other. For example, each of the third threshold value TH3 and the fourth threshold value TH4 may be greater than 0 m and less than 0.2 m, and may preferably be 0.1 m.

When the absolute value of the coordinate difference in Equation 23 is less than the fourth threshold value TH4, the curb candidate points are determined to be non-curb points (step 396). When the absolute value of each of the X-axis coordinate difference and the Y-axis coordinate difference between the points FSP located in the free space and the curb candidate points is less than, for example, 0.1 m (that is, when the curb candidate points are located within 0.1 m from the non-curb points), the curb candidate points are determined to be non-curb points, and are eliminated.

Referring to FIGS. 12B and 12C, it can be seen that the non-curb points 30 are eliminated from among the curb candidate points by performing the above-described third error verification step.

On the other hand, when the absolute value of the coordinate difference in Equation 22 is equal to or greater than the third threshold value TH3, or when the absolute value of the coordinate difference in Equation 23 is equal to or greater than the fourth threshold value TH4, the curb candidate points are finally determined to be curb points (step 398).

Meanwhile, a recording medium in which a program for executing the method 100 of detecting a curb using a LiDAR sensor is recorded may store a program for implementing a function of selecting road points from a point cloud acquired by a LiDAR sensor and a function of detecting multiple consecutive points, which have a constant first slope in a first plane viewed from above and a second slope having a constant sign in a second plane viewed from the side, as curb candidate points, which are candidates for curb points. The recording medium may be read by a computer system.

In addition, the program for executing the method of detecting a curb may further implement at least one of a first error verification function of, when multiple neighboring points located in a layer adjacent to the layer in which the curb candidate points are located are non-road points, rather than road points, detecting points other than the curb points from among the curb candidate points based on the variance and average of the coordinates of the multiple neighboring points, a second error verification function of, using a reference line segment formed by the curb candidate points belonging to an arbitrary layer and a target line segment formed by the curb candidate points belonging to a layer adjacent to the arbitrary layer, detecting points other than the curb points from among the curb candidate points belonging to the arbitrary layer, or a third error verification function of, when the absolute value of a difference in vertical-axis coordinates between points located in a free space and the curb candidate points is less than a third threshold value and when the absolute value of a difference in horizontal-axis coordinates between the points located in the free space and the curb candidate points is less than a fourth threshold value, determining the curb candidate points not to be curb points. In this case, a vehicle equipped with the LiDAR sensor travels in a first direction parallel to the vertical axis, and a second direction parallel to the horizontal axis intersects the first direction.

The computer-readable recording medium includes all kinds of recording devices in which data capable of being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium can also be distributed over network-connected computer systems so that the computer-readable code is stored and executed in a distributed fashion. Also, functional programs, code, and code segments for accomplishing the method 100 of detecting a curb using a LiDAR sensor can be easily devised by programmers skilled in the art to which the present disclosure pertains.

Hereinafter, the configuration and operation of the apparatus 1000 for detecting a curb using a LiDAR sensor according to an embodiment will be described with reference to the accompanying drawings.

FIG. 13 is a block diagram of an embodiment 600A of the curb detector shown in FIG. 2.

The curb detector 600A shown in FIG. 13 may include a road point selector 652, a curb candidate point detector 654, and first to third error verifiers 656, 658, and 662.

The curb detector 600A shown in FIG. 13 may perform step 120 shown in FIG. 1 and step 120A shown in FIG. 3, and may correspond to an embodiment of the curb detector 600 shown in FIG. 2, but the embodiments are not limited thereto. That is, the curb detector 600A shown in FIG. 13 may perform step 120 shown in FIG. 1 in a manner different from step 120A shown in FIG. 3. Alternatively, step 120A shown in FIG. 3 may be performed by a curb detector configured differently from the curb detector 600A shown in FIG. 13.

The road point selector 652 receives a point cloud acquired by the LiDAR sensor 500 through an input terminal IN, selects road points from the point cloud, and outputs the selected road points to the curb candidate point detector 654. That is, the road point selector 652 serves to perform step 210 shown in FIG. 3.

The curb candidate point detector 654 may detect, among the road points output from the road surface selector 652, multiple consecutive points, which have a constant first slope in a first plane viewed from above and a second slope having a constant sign in a second plane viewed from the side, as curb candidate points, which are candidates for curb points, and may output the detected curb candidate points to the first error verifier 656. That is, the curb candidate point detector 654 serves to perform step 220 shown in FIG. 3.

When multiple neighboring points located in a layer adjacent to the layer in which the curb candidate points detected by the curb candidate point detector 654 are located are non-road points, rather than road points, the first error verifier 656 detects points other than the curb points from among the curb candidate points based on the variance and average of the coordinates of the multiple neighboring points. That is, the first error verifier 656 serves to perform step 230 shown in FIG. 3.

Using a reference line segment formed by the curb candidate points belonging to an arbitrary layer and a target line segment formed by the curb candidate points belonging to a layer adjacent to the arbitrary layer, the second error verifier 658 detects points other than the curb points from among the curb candidate points belonging to the arbitrary layer. To this end, the second error verifier 658 may receive only the curb candidate points that are determined not to be curb points and are eliminated by the first error verifier 656, among the curb candidate points detected by the curb candidate point detector 654. That is, the second error verifier 658 serves to perform step 240 shown in FIG. 3.

When the absolute value of a difference in X-axis coordinates between points located in a free space and the curb candidate points is less than a third threshold value and when the absolute value of a difference in Y-axis coordinates between the points located in the free space and the curb candidate points is less than a fourth threshold value, the third error verifier 662 may determine the curb candidate points not to be curb points, and may output the result of the determination through an output terminal OUT1. To this end, the third error verifier 662 may receive only the curb candidate points that are determined not to be curb points and are eliminated by the second error verifier 658, but the embodiments are not limited thereto. That is, the third error verifier 662 may perform step 250 shown in FIG. 3.

The curb points detected by the curb detection method 100 described above may be used in various fields.

According to one embodiment, final curb line fitting may be performed using the curb points detected by the curb detection method 100 according to the embodiment. For example, information about the curb line formed by the curb points may be used for high-definition-map-based positioning of the host vehicle. High-definition-map-based positioning is a process of estimating the position of the host vehicle by comparing the curb in the high-definition map with the curb line detected by the method according to the embodiment.

According to another embodiment, an object-tracking method 400 according to the embodiment may be implemented in order to track an object using the curb points detected by the curb detection method 100 described above.

FIG. 14 is a flowchart for explaining the object-tracking method 400 according to an embodiment.

The object-tracking method 400 shown in FIG. 14 includes acquiring a point cloud generated by the LiDAR sensor 500 (step 110). Here, since step 110 is the same as step 110 shown in FIG. 1, the same reference numeral is assigned thereto, and a duplicate description thereof will be omitted.

After step 110, the point cloud generated by the LiDAR sensor 500 may be preprocessed (step 130). For example, data pertaining to reflections from the body of the host vehicle may be removed in step 130. That is, because there is a region that is shielded by the body of the host vehicle depending on the mounting position and the field of view of the LiDAR sensor 500, data pertaining to reflections from the body of the host vehicle may be removed using a reference coordinate system in step 130.

After step 130, clustering is performed on the preprocessed points (step 140). The term "clustering" refers to a process of classifying the preprocessed points into groups such that each group includes points associated with the same object. For example, the points preprocessed in step 130 may be classified into groups such that each group includes points associated with the same object.

After step 140, the result of clustering is converted into a plurality of geometric box shapes for each channel, and at least one of the width, length, position, or orientation (or heading) of the box is output as information about the box in order to analyze the shape of the object (step 150).

After step 150, whether the object, the shape of which has been analyzed, is an obstacle, a vehicle, a person, a road surface, or a curb may be tracked and recognized (step 160). To this end, the curb points detected by the curb detection method 100 according to the embodiment may be used.

For example, steps 210 to 240 shown in FIG. 3 may be performed in step 130 shown in FIG. 14. In this case, step 250 may be performed in step 140 shown in FIG. 1, or may be performed separately after step 140 shown in FIG. 14 is performed and before step 150 shown in FIG. 14 is performed. Alternatively, step 140 may be performed after step 240 shown in FIG. 3 is performed and before step 250 shown in FIG. 3 is performed.

Also, the points FSP located in the free space, which are necessary to perform step 250 shown in FIG. 3 and steps 392 and 394 shown in FIG. 11, may be detected by performing clustering in step 140. However, the embodiments are not limited thereto.

Hereinafter, a comparative example and the curb detection method according to an embodiment will be described with reference to the accompanying drawings.

Unlike a camera, a LiDAR sensor is not capable of acquiring visual information such as color, and thus needs to recognize an object using only the geometric information on points. The curb detection method according to the comparative example recognizes a curb using the geometric characteristics of points located on the curb. However, the curb detection method according to the comparative example, which uses only the absolute heights (i.e., the Z-axis coordinates) of points, has a limitation with regard to accuracy of recognition of the curb. The reason for this is that the Z-axis coordinate value in the situation in which a road is uneven or a vehicle shakes increases or decreases, compared to an ideal situation in which a road is even or a vehicle travels without shaking.

In contrast, the curb detection method 100 according to an embodiment detects curb points using a relative value derived from the relationship between neighboring points, such as a slope, rather than an absolute numerical value such as Z-axis coordinates.

FIGS. 15A and 15B are views showing final curb points obtained by the curb detection method 100 according to an embodiment.

When curb points are detected using a relative value such as a slope, points associated with an object (e.g., another vehicle or a wall) having a slope similar to that of a curb may be incorrectly detected as curb points. In order to prevent this, according to an embodiment, the first to third error verification steps are performed to eliminate non-curb points from among the curb candidate points. When curb candidate points are obtained as shown in FIG. 15B in association with a curb, which is located in the vicinity of the host vehicle 10, which travels as shown in FIG. 15A, the first error verification step is performed to eliminate non-curb points 40 in FIG. 15B, the second error verification step is performed to eliminate non-curb points 50 in FIG. 15B, and the third error verification step is performed to eliminate non-curb points 60 in FIG. 15B, whereby points associated with the curb (points 70 shown in FIG. 15B) may be finally obtained.

Accordingly, according to an embodiment, it is possible to accurately detect curb points from a point cloud acquired using a LiDAR sensor and to utilize the detected curb points for precise positioning. Precise positioning using a LiDAR sensor is most important in autonomous driving at level 4 or higher. However, it may be difficult to perform precise positioning depending on the environment of the road on which the vehicle travels. For example, in an environment in which objects (e.g., buildings or walls) necessary to perform precise positioning are insufficient or rare, a curb present on the road on which the vehicle travels may be used as base data for precise positioning.

Also, the reason for performing precise positioning is to recognize the lane of the road on which the vehicle is traveling. In most cases, a road and a curb are present together, and thus the curb can be regarded as optimal base data for precise positioning.

In consideration of this, information about a curb is accurately detected by the method and apparatus for detecting a curb using a LiDAR sensor and the recording medium storing a program to execute the method according to the embodiments, and is usefully utilized for autonomous driving at level 4 or higher.

As is apparent from the above description, according to the method and apparatus for detecting a curb using a LiDAR sensor and the recording medium storing a program to execute the method according to the embodiments, it is possible to accurately detect curb points. Further, the detected curb points may be utilized for precise positioning, and may thus be usefully utilized for autonomous driving at level 4 or higher. Furthermore, the detected curb points may also be utilized for object tracking.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of using a LiDAR sensor to detect a curb, the method comprising:
   using the LiDAR sensor to acquire a point cloud;
   selecting road points from the point cloud acquired by the LiDAR sensor;
   detecting multiple consecutive points, having a constant first slope in a first plane viewed from above and a second slope having a constant sign in a second plane viewed from a side, as curb candidate points from among the road points, the curb candidate points being candidates for curb points; and
   using the curb candidate points to recognize a curb so that a vehicle equipped with the LiDAR sensor and being driven can be positioned on a lane of a road that is present together with the curb.

2. The method according to claim 1, wherein detecting the curb candidate points comprises:
   finding multiple consecutive current points having a height equal to or less than a threshold height and located a first spacing distance from a previous point from among the road points, the first spacing distance being shorter than a first threshold distance;
   determining whether the first slope formed by the found multiple consecutive current points is constant;
   determining whether a sign of the second slope is constant when the first slope is constant; and
   finally determining the found multiple consecutive current points as the curb candidate points when the sign of the second slope is constant.

3. The method according to claim 2, wherein finding the multiple consecutive current points comprises:
   determining whether heights of sample points selected sequentially from among the road points in an order of a sample index in each layer are equal to or less than the threshold height;
   storing coordinates of the sample points having heights equal to or less than the threshold height when the previous point, selected before the sample points having heights equal to or less than the threshold height are selected, is not present;
   storing coordinates of the sample points when the previous point is present and when the first spacing distance between the sample points and the previous point is shorter than the first threshold distance; and
   when a number of the sample points having the stored coordinates is not "I" (where "I" is a positive integer of 2 or greater), proceeding to determining whether the heights of the sample points are equal to or less than the threshold height, and determining, when the number of the sample points having the stored coordinates is "I", the "I" sample points as the found multiple consecutive current points.

4. The method according to claim 3, wherein determining whether the first slope is constant comprises:
    selecting points spaced a constant interval apart from each other from among the found multiple consecutive current points;
    determining, from among the selected points, whether a difference between neighboring slopes of neighboring points, a difference between non-neighboring slopes of non-neighboring points that are not adjacent to each other, or a difference between all of slopes including the neighboring slopes and the non-neighboring slopes is within a predetermined range of permissible values; and
    determining the first slope to be constant when the difference between the neighboring slopes, the difference between the non-neighboring slopes, or the difference between all of the slopes including the neighboring slopes and the non-neighboring slopes is within the predetermined range of permissible values.

5. The method according to claim 4, wherein finally determining the found multiple consecutive current points as the curb candidate points comprises determining the "I" sample points having the stored coordinates as the curb candidate points when the sign of the second slope is determined to be constant.

6. The method according to claim 1, further comprising a first error verification step of detecting, when multiple neighboring points located in a layer adjacent to a layer in which the curb candidate points are located are non-road points, which are not the road points, points other than the curb points from among the curb candidate points based on a variance and an average of coordinates of the multiple neighboring points.

7. The method according to claim 6, wherein the first error verification step comprises:
    determining whether the multiple neighboring points are the non-road points;
    obtaining the average and the variance of the coordinates of the multiple neighboring points when the multiple neighboring points are the non-road points;
    determining whether the variance is less than a threshold variance;
    determining whether a first absolute value is less than a threshold average as follows:

$|AV-P|<THa$ where "|AV−P|" represents the first absolute value, "AV" represents the average, "P" represents coordinates of the curb candidate points, and "THa" represents the threshold average; and
    determining the curb candidate points not to be the curb points when the variance is less than the threshold variance and when the first absolute value is less than the threshold average.

8. The method according to claim 7, wherein the first error verification step comprises:
    a 1-$1^{st}$ error verification step of determining whether the curb candidate points having a slope closer to a vertical axis are not the curb points; and
    a 1-$2^{nd}$ error verification step of determining whether the curb candidate points having a slope closer to a horizontal axis are not the curb points.

9. The method according to claim 8, wherein, in the 1-$1^{st}$ error verification step or the 1-$2^{nd}$ error verification step:
    the variance corresponds to a variance of a weighted sum of horizontal-axis coordinates and vertical-axis coordinates of the multiple neighboring points;
    the average corresponds to an average of the weighted sum of the horizontal-axis coordinates and the vertical-axis coordinates of the multiple neighboring points;
    the "P" represents a weighted sum of horizontal-axis coordinates and vertical-axis coordinates of the curb candidate points; and
    the vehicle is configured to travel in a first direction parallel to the vertical axis, and a second direction parallel to the horizontal axis intersects the first direction.

10. The method according to claim 6, wherein, in the layer adjacent to the layer in which the curb candidate points are located, when neighboring points located in a vicinity of an azimuth at which the curb candidate points are located are the non-road points, points other than the curb points are detected from among the curb candidate points based on the variance and the average.

11. The method according to claim 6, further comprising a second error verification step of detecting, using a reference line segment formed by the curb candidate points belonging to an arbitrary layer and a target line segment formed by the curb candidate points belonging to a layer adjacent to the arbitrary layer, points other than the curb points from among the curb candidate points belonging to the arbitrary layer.

12. The method according to claim 11, wherein the second error verification step comprises:
    selecting a reference start point and a reference ending point forming the reference line segment from among the curb candidate points belonging to the arbitrary layer;
    obtaining a length of the reference line segment formed by the reference start point and the reference ending point when the reference start point and the reference ending point are located in a same layer;
    obtaining coefficients of the reference line segment when the length of the reference line segment is shorter than a threshold length;
    selecting a target start point from among the curb candidate points belonging to the layer adjacent to the arbitrary layer and selecting a target ending point present in a same layer as the target start point and located within a second threshold distance from the target start point;
    obtaining a second spacing distance between the reference line segment and the target start point using coordinates of the target start point and the coefficients;
    forming the target line segment using the target start point and the target ending point;
    obtaining a reference slope of the reference line segment, a target slope of the target line segment, a third spacing distance between the reference start point and the target start point, and a third slope of a straight line interconnecting the target start point and the reference ending point; and
    finding points other than the curb points from among the curb candidate points belonging to the arbitrary layer using the reference slope, the target slope, the second spacing distance, the third spacing distance, or the third slope.

13. The method according to claim 12, wherein finding points other than the curb points from among the curb candidate points comprises:

determining whether a second absolute value of a difference between the reference slope and the target slope is less than a first threshold value;

determining whether the second spacing distance is shorter than a third threshold distance when the second absolute value is less than the first threshold value;

determining whether the third spacing distance is shorter than a fourth threshold distance when the second spacing distance is shorter than the third threshold distance;

determining whether a third absolute value of a difference between the reference slope and the third slope is less than a second threshold value when the third spacing distance is shorter than the fourth threshold distance; and determining the curb candidate points belonging to the arbitrary layer not to be the curb points when the second absolute value is equal to or greater than the first threshold value, when the second spacing distance is equal to or longer than the third threshold distance, when the third spacing distance is equal to or longer than the fourth threshold distance, or when the third absolute value is equal to or greater than the second threshold value, and when both the target start point and the target ending point are selected in the layer adjacent to the arbitrary layer.

14. The method according to claim 11, further comprising:

a third error verification step of determining the curb candidate points not to be the curb points when an absolute value of a difference in vertical-axis coordinates between points located in a free space and the curb candidate points is less than a third threshold value and when an absolute value of a difference in horizontal-axis coordinates between the points located in the free space and the curb candidate points is less than a fourth threshold value, wherein the vehicle is configured to travel in a first direction parallel to the vertical axis, and a second direction parallel to the horizontal axis intersects the first direction.

15. An apparatus for detecting a curb, the apparatus comprising:

a road point selector configured to select road points from a point cloud acquired by a LiDAR sensor; and a curb candidate point detector configured to detect multiple consecutive points having a constant first slope in a first plane viewed from above and a second slope having a constant sign in a second plane viewed from a side as curb candidate points from among the road points, the curb candidate points being candidates for curb points used to recognize a curb so that a vehicle equipped with the LiDAR sensor and being driven can be positioned on a lane of a road that is present together with the curb.

16. The apparatus according to claim 15, further comprising a first error verifier configured to detect, when multiple neighboring points located in a layer adjacent to a layer in which the curb candidate points are located are non-road points, which are not the road points, points other than the curb points from among the curb candidate points based on a variance and an average of coordinates of the multiple neighboring points.

17. The apparatus according to claim 16, further comprising a second error verifier configured to detect, using a reference line segment formed by the curb candidate points belonging to an arbitrary layer and a target line segment formed by the curb candidate points belonging to a layer adjacent to the arbitrary layer, points other than the curb points from among the curb candidate points belonging to the arbitrary layer.

18. The apparatus according to claim 17, further comprising a third error verifier configured to determine the curb candidate points not to be the curb points when an absolute value of a difference in vertical-axis coordinates between points located in a free space and the curb candidate points is less than a third threshold value and when an absolute value of a difference in horizontal-axis coordinates between the points located in the free space and the curb candidate points is less than a fourth threshold value, wherein the vehicle is configured to travel in a first direction parallel to a vertical axis, and a second direction parallel to a horizontal axis intersects the first direction.

19. A non-transitory computer-readable recording medium in which a program for executing a method of detecting a curb is recorded, the computer-readable recording medium storing the program to implement:

a function of selecting road points from a point cloud acquired by a LiDAR sensor;

a function of detecting multiple consecutive points having a constant first slope in a first plane viewed from above and a second slope having a constant sign in a second plane viewed from a side as curb candidate points from among the road points, the curb candidate points being candidates for curb points; and a function of using the curb candidate points to recognize a curb so that a vehicle being driven can be positioned on a lane of a road that is present together with the curb.

20. The computer-readable recording medium according to claim 19, wherein the program further implements:

a first error verification function of, when multiple neighboring points located in a layer adjacent to a layer in which the curb candidate points are located are non-road points, which are not the road points, detecting points other than the curb points from among the curb candidate points based on a variance and an average of coordinates of the multiple neighboring points;

a second error verification function of, using a reference line segment formed by the curb candidate points belonging to an arbitrary layer and a target line segment formed by the curb candidate points belonging to a layer adjacent to the arbitrary layer, detecting points other than the curb points from among the curb candidate points belonging to the arbitrary layer; and a third error verification function of, when an absolute value of a difference in vertical-axis coordinates between points located in a free space and the curb candidate points is less than a third threshold value and when an absolute value of a difference in horizontal-axis coordinates between the points located in the free space and the curb candidate points is less than a fourth threshold value, determining the curb candidate points not to be the curb points; and wherein the vehicle is configured to travel in a first direction parallel to a vertical axis, and a second direction parallel to a horizontal axis intersects the first direction.

* * * * *

UNITED STATES PATENT AND TRADEMARK OFFICE
CERTIFICATE OF CORRECTION

PATENT NO. : 12,292,507 B2
APPLICATION NO. : 17/746204
DATED : May 6, 2025
INVENTOR(S) : Park et al.

Page 1 of 1

It is certified that error appears in the above-identified patent and that said Letters Patent is hereby corrected as shown below:

In the Claims

In Column 30, in Claim 19, Line 32, after "a vehicle" insert -- equipped with the LiDAR sensor and --.

Signed and Sealed this
Twenty-fourth Day of June, 2025

Coke Morgan Stewart
*Acting Director of the United States Patent and Trademark Office*